United States Patent
Kim et al.

(10) Patent No.: US 12,477,051 B2
(45) Date of Patent: Nov. 18, 2025

(54) ELECTRONIC DEVICE INCLUDING ANTENNA AND METHOD FOR MANUFACTURING THE SAME

(71) Applicant: Samsung Electronics Co., Ltd., Gyeonggi-do (KR)

(72) Inventors: Hyungjin Kim, Gyeonggi-do (KR); Jiho Kim, Gyeonggi-do (KR); Seongyong An, Gyeonggi-do (KR); Kyihyun Jang, Gyeonggi-do (KR); Yoonjung Kim, Gyeonggi-do (KR); Kyungmoon Seol, Gyeonggi-do (KR); Bumjin Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 17/883,810

(22) Filed: Aug. 9, 2022

(65) Prior Publication Data
US 2023/0038634 A1    Feb. 9, 2023

Related U.S. Application Data

(63) Continuation of application No. PCT/KR2022/011729, filed on Aug. 8, 2022.

(30) Foreign Application Priority Data

Aug. 9, 2021  (KR) .......................... 10-2021-0104348

(51) Int. Cl.
| H04M 1/26 | (2006.01) |
| H01Q 1/24 | (2006.01) |
| H04M 1/02 | (2006.01) |

(52) U.S. Cl.
CPC ............ *H04M 1/026* (2013.01); *H01Q 1/243* (2013.01)

(58) Field of Classification Search
CPC ....... H04M 1/02; H04M 1/0249; H04M 1/026
(Continued)

(56) References Cited

U.S. PATENT DOCUMENTS 9,929,679 B2 *  3/2018  Asanuma ................ H02N 2/18
10,606,218 B1   3/2020  Ely et al.
(Continued)

FOREIGN PATENT DOCUMENTS

| CN | 111107205 A | 5/2020 |
| KR | 10-2019-0011169 A | 2/2019 |

(Continued)

OTHER PUBLICATIONS

Extended European Search Report dated Sep. 25, 2024.
International Search Report dated Nov. 16, 2022.
Korean Office Action dated Sep. 9, 2025.

*Primary Examiner* — Joseph Arevalo
(74) *Attorney, Agent, or Firm* — Cha & Reiter, LLC.

(57) ABSTRACT

An electronic device may include a housing including a front plate, a rear plate, and a side member surrounding a space formed by the front plate and the rear plate, a support member disposed in the space, at least one electronic component disposed in the space, a first non-conductive member disposed on at least a portion of the support member and on the side member, a conductive pattern at least partially disposed between the side member and the first non-conductive member, and a second non-conductive member disposed between the side member and a portion of the conductive pattern and a portion of the first non-conductive member, at least a portion of the conductive pattern may be spaced apart from the at least one electronic component by a predetermined distance, and a first inclined surface may be formed on a portion of the first non-conductive member.

21 Claims, 16 Drawing Sheets

(58) Field of Classification Search
USPC ........ 455/575.5, 575.4, 79, 566, 575.1, 560, 455/552.1, 558, 557.7
See application file for complete search history.

(56) References Cited

U.S. PATENT DOCUMENTS

| | | | |
|---|---|---|---|
| 2015/0090579 A1* | 4/2015 | Kurikawa | H03K 17/962 200/600 |
| 2015/0170582 A1* | 6/2015 | Shimizu | G09G 3/3406 345/206 |
| 2017/0135239 A1* | 5/2017 | Hyun | H04M 1/236 |
| 2017/0308781 A1* | 10/2017 | Foerster | G06K 19/067 |
| 2019/0027812 A1 | 1/2019 | Kim et al. | |
| 2020/0266520 A1 | 8/2020 | Moon et al. | |
| 2020/0266522 A1 | 8/2020 | Moon et al. | |
| 2020/0329550 A1 | 10/2020 | Seo et al. | |
| 2020/0365972 A1 | 11/2020 | Jeon et al. | |
| 2021/0126347 A1 | 4/2021 | Kim et al. | |
| 2021/0298174 A1 | 9/2021 | Lee et al. | |
| 2022/0182743 A1* | 6/2022 | Nam | B60K 35/28 |
| 2022/0283024 A1* | 9/2022 | Neevel | G01J 1/0474 |
| 2022/0284214 A1* | 9/2022 | Tomasetta | G06V 40/172 |
| 2022/0286539 A1* | 9/2022 | Stobbe | H04R 1/023 |
| 2022/0286540 A1* | 9/2022 | Gillier | H04R 1/023 |
| 2022/0286543 A1* | 9/2022 | Hale | H04M 1/0249 |
| 2022/0286545 A1* | 9/2022 | Koch | G06F 1/1637 |
| 2022/0311128 A1 | 9/2022 | Seo et al. | |
| 2022/0329678 A1* | 10/2022 | Zhang | H04N 23/57 |
| 2023/0007108 A1 | 1/2023 | An et al. | |
| 2023/0055951 A1 | 2/2023 | Jang et al. | |
| 2023/0217106 A1* | 7/2023 | Park | H02K 41/0354 348/333.01 |

FOREIGN PATENT DOCUMENTS

| | | |
|---|---|---|
| KR | 10-2020-0017470 A | 2/2020 |
| KR | 10-2020-0101172 A | 8/2020 |
| KR | 10-2020-0121037 A | 10/2020 |
| KR | 10-2020-0131775 A | 11/2020 |
| KR | 10-2021-0050267 A | 5/2021 |
| KR | 10-2021-0079998 A | 6/2021 |
| KR | 10-2418533 B1 | 7/2022 |
| KR | 10-2558978 B1 | 7/2023 |
| WO | 2021/221316 A1 | 11/2021 |

\* cited by examiner

ELECTRONIC DEVICE INCLUDING ANTENNA AND METHOD FOR MANUFACTURING THE SAME

CROSS REFERENCE TO RELATED APPLICATION(S)

This application is a continuation of International Application No. PCT/KR2022/011729, filed on Aug. 8, 2022, which claims priority to Korean Patent Application No. 10-2021-0104348 filed on Aug. 9, 2021 in the Korean Intellectual Property Office, the disclosure of which are incorporated by reference herein their entirety.

BACKGROUND

Technical Field

Certain embodiments of the disclosure relate to an electronic device including an antenna, and a method for manufacturing the electronic device.

Description of Related Art

Electronic devices such as bar-type, foldable-type, rollable-type, or sliding-type smartphones and tablet PCs are increasingly used to provide a variety of functions including, for example, a communication functionality.

For example, an electronic device may be used to make a phone call with another electronic device through wireless communication, and may transmit and receive certain pieces of data.

The electronic device may include at least one antenna to perform wireless communication with another electronic device by using a network.

SUMMARY

An electronic device may have a support member, at least a part of which includes a conductive material (for example, metal). At least a part of the support member (for example, conductive material) may be used as an antenna radiator (for example, conductive pattern) for performing wireless communication.

At least a part of a side member that forms the exterior of the electronic device may include a nonconductive material (for example, ceramic) in order to implement certain designs.

When a part of the side member (for example, housing) of the electronic device includes a nonconductive material, a conductive pattern may be disposed inside the side member and used as an antenna radiator. A nonconductive injection-molded material (for example, second nonconductive member) may be disposed between the side member and the conductive pattern.

The conductive pattern (for example, antenna radiator), if disposed inside the side member, may have a reduced distance from another electronic component (for example, display) including a conductive material based on the thickness of the nonconductive injection-molded material (for example, second nonconductive member), thereby incurring interference between the conductive pattern and the other electronic component, and degrading the antenna radiation performance.

Certain embodiments of the disclosure may provide an electronic device and a method for manufacturing the electronic device, wherein the thickness of a nonconductive injection-molded material (for example, second nonconductive member) for bonding a conductive pattern and a side member that forms the exterior of the electronic device may be reduced, and a distance for spacing between the conductive pattern and another electronic component may be secured.

Certain embodiments of the disclosure may provide an electronic device and a method for manufacturing the electronic device, wherein the thickness of a nonconductive injection-molded material (for example, second nonconductive member) for bonding a conductive pattern and a side member that forms the exterior of the electronic device may be reduced, and a distance for spacing between the conductive pattern and another electronic component may be secured.

An electronic device according to certain embodiments of the disclosure may include a housing including a front plate, a rear plate, and a side member surrounds a space defined by the front plate and the rear plate, a support member disposed in the space, at least one electronic component disposed in the space, a first non-conductive member disposed on at least a portion of the support member and on the side member, a conductive pattern at least partially disposed between the side member and the first non-conductive member, a second non-conductive member disposed between the side member and a first portion of the conductive pattern and a first portion of the first non-conductive member, wherein at least a second portion of the conductive pattern is spaced apart from the at least one electronic component by a predetermined distance, and a first inclined surface is formed on a second portion of the first non-conductive member.

An electronic device according to certain embodiments of the disclosure may include a housing including a front plate, a rear plate, and a side member surrounds a space defined by the front plate and the rear plate, a support member disposed in the space, at least one electronic component disposed in the space, a first non-conductive member disposed on at least a portion of the support member and on the side member, a conductive pattern at least partially disposed between the side member and the first non-conductive member, and a second non-conductive member disposed between the side member and a portion of the conductive pattern and a portion of the first non-conductive member, wherein at least a portion of the conductive pattern is spaced apart from the at least one electronic component by a predetermined distance, and each of a first inclined surface and a second inclined surface is disposed on at least a portion of the first non-conductive member.

An electronic device according to certain embodiments of the disclosure may include a housing including a front plate, a rear plate, and a side member surrounds a space defined by the front plate and the rear plate, a support member disposed in the space, at least one electronic component disposed in the space, a first non-conductive member disposed on at least a portion of the support member and on the side member, a conductive pattern disposed at least partially between the side member and the first non-conductive member, and a second non-conductive member disposed between the side member and a portion of the conductive pattern and a portion of the first non-conductive member, wherein at least a portion of the conductive pattern is spaced apart from the at least one electronic component by a predetermined distance, and a first inclined surface is disposed on a portion of the conductive pattern.

A method for manufacturing an electronic device according to certain embodiments of the disclosure may include machining a metal material into shapes of a support member and a conductive pattern by applying a die casting or computerized numerical control (CNC) process thereto, coupling the first non-conductive member to at least a portion of the machined support member and at least a portion of the machined conductive pattern by using insert-injection, machining the outer surfaces of the insert-injected support member, conductive pattern, and/or first non-conductive member by using a computerized numerical control (CNC) process such that a second non-conductive member can be injection-molded, injection-molding the second non-conductive member by using insert-injection performed between the machined conductive pattern and the machined side member, and by using a computerized numerical control (CNC) process, machining the outer surface of the side member and forming a contact surface of the conductive pattern.

According to certain embodiments of the disclosure, the thickness (for example, width) of a nonconductive injection-molded material (for example, second nonconductive member) for bonding a conductive pattern (for example, antenna radiator) and a side member (for example, ceramic) that forms the exterior of the electronic device may be reduced, and a distance for spacing between the conductive pattern and another electronic component (for example, display) may be secured, thereby preventing antenna radiation performance degradation.

BRIEF DESCRIPTION OF THE DRAWINGS

In connection with the description of the drawings, the same or similar reference numerals may be used for the same or similar components.

DETAILED DESCRIPTION

Figure 1:
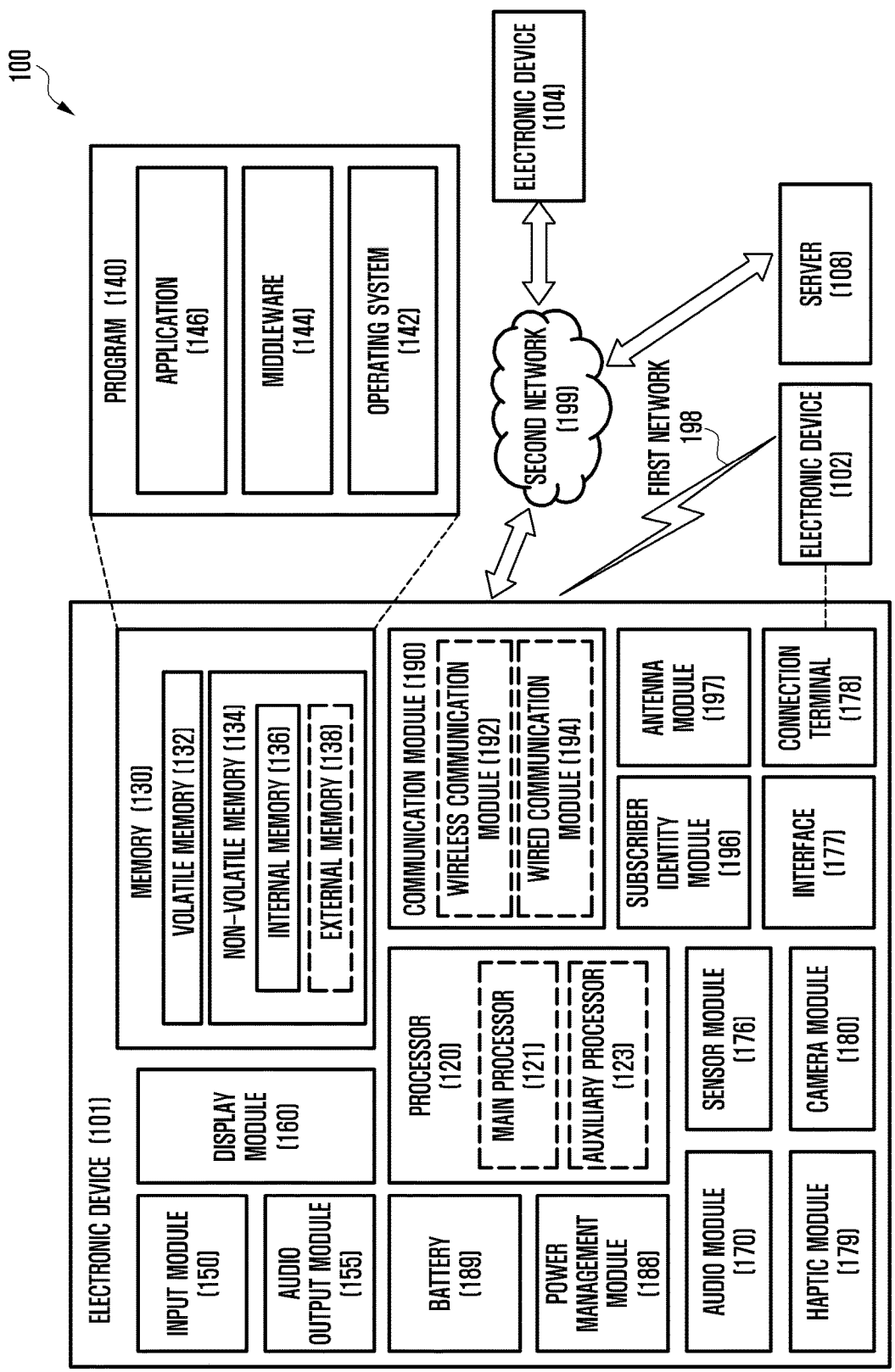
FIG. 1 is a block diagram of an electronic device in a network environment according to certain embodiments of the disclosure.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform certain data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store certain data used by at least one component (e.g., the processor 120 or the sensor module 176) of the electronic device 101. The certain data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These certain types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support certain technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support certain requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of certain types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include certain changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
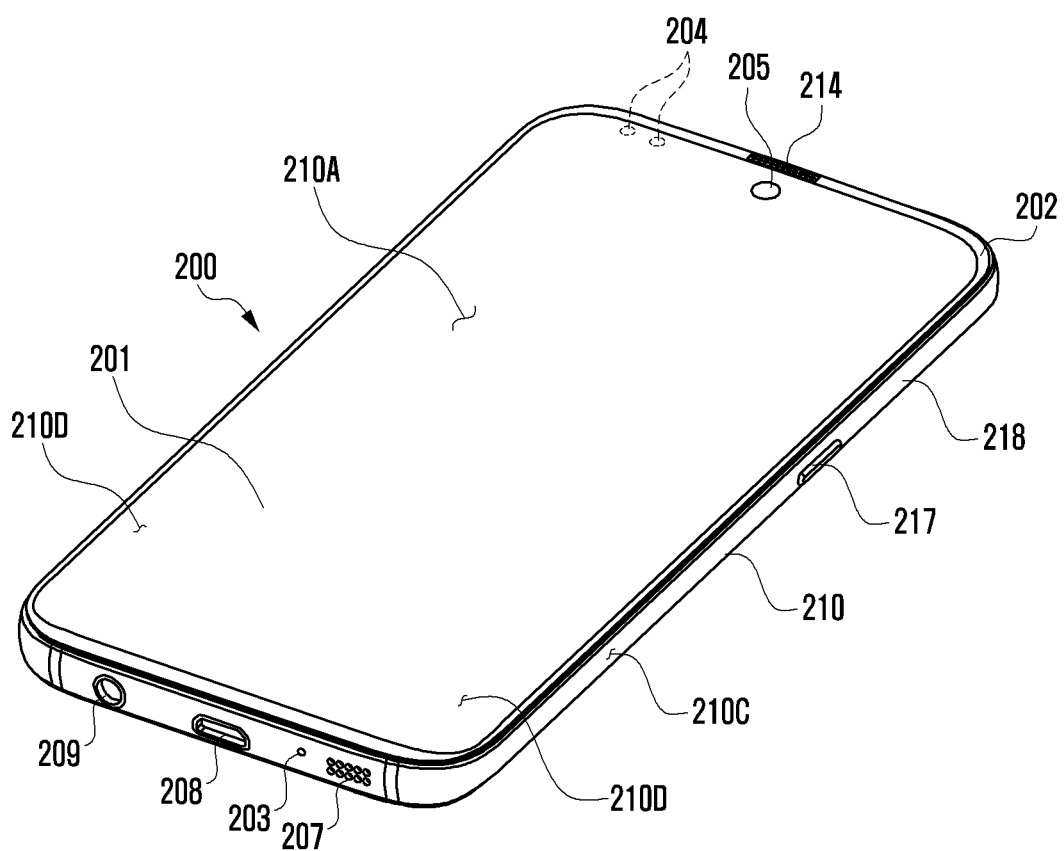
FIG. 2A is a perspective view of a front surface of an electronic device according to certain embodiments of the disclosure.
Figure 2B:
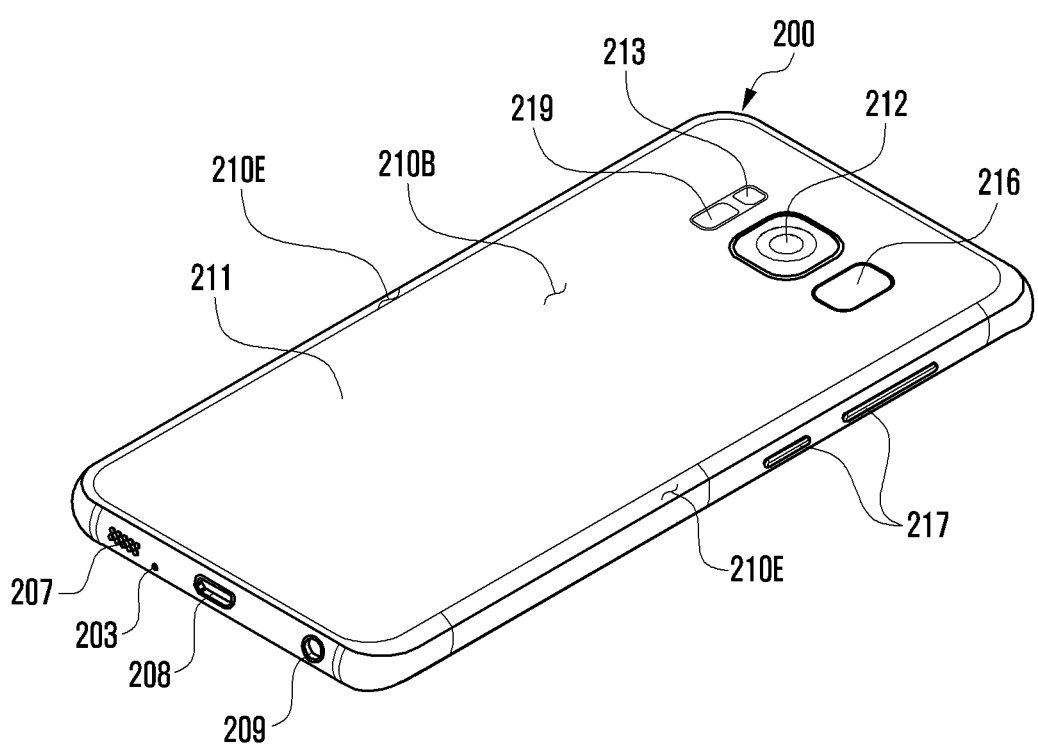
FIG. 2B is a perspective view of a rear surface of an electronic device according to certain embodiments of the disclosure.

FIG. 2A is a perspective view of a front surface of an electronic device according to certain embodiments of the disclosure. FIG. 2B is a perspective view of a rear surface of an electronic device according to certain embodiments of the disclosure.

Referring to FIG. 2A and FIG. 2B, an electronic device 200 according to an embodiment may include a housing 210 including a first surface (or front surface) 210A, a second surface (or rear surface) 210B, and a side surface 210C surrounding the space between the first surface 210A and the second surface 210B. In another embodiment (not illustrated), the housing may denote a structure that forms a part of the first surface 210A, the second surface 210B, and the side surface 210C illustrated in FIG. 2A and FIG. 2B. According to an embodiment, the first surface 210A may be formed by a front plate 202, at least a part of which is substantially transparent (for example, a glass plate including certain coating layers, or a polymer plate). The second surface 210B may be formed by a rear plate 211 that is substantially opaque. The rear plate 211 may be made of coated or colored glass, ceramic, polymer, metal (for example, aluminum, stainless steel (STS), or magnesium), or a combination of at least two of the above-mentioned materials. The side surface 210C may be formed by a side bezel structure (or "side member") 218 which is coupled to the front plate 202 and to the rear plate 211, and which includes metal and/or polymer. In some embodiments, the rear plate 211 and the side bezel structure 218 may be formed integrally and may include the same material (for example, a metal material such as aluminum).

In the illustrated embodiment, the front plate 202 may include two first areas 210D on both ends of the long edge of the front plate 202 such that the two first areas 210D bend from the first surface 210A toward the rear plate 211 and extend seamlessly. In the illustrated embodiment (see FIG. 2B), the rear plate 211 may include two second areas 210E on both ends of the long edge such that the two second areas 210E bend from the second surface 210B toward the front plate 202 and extend seamlessly. In some embodiments, the front plate 202 (or the rear plate 211) may include only one of the first areas 210D (or the second areas 210E). In another embodiment, a part of the first areas 210D or the second areas 210E may not be included. In the above embodiments, when seen from the side surface of the electronic device 200, the side bezel structure 218 may have a first thickness (or width) on a part of the side surface, which does not include the first areas 210D or the second areas 210E as described above, and may have a second thickness that is smaller than the first thickness on a part of the side surface, which includes the first areas 210D or the second areas 210E.

According to an embodiment, the electronic device 200 may include at least one of a display 201, audio modules 203, 207, and 214, sensor modules 204, 216, and 219, camera modules 205, 212, and 313, a key input device 217, a light-emitting element 206, and connector holes 208 and 209. In some embodiments, at least one of the constituent elements (for example, the key input device 217 or the light-emitting element 206) of the electronic device 200 may be omitted, or the electronic device 200 may additionally include another constituent element.

The display 201 may be exposed through a corresponding part of the front plate 202, for example. In some embodiments, at least a part of the display 201 may be exposed through the front plate 202 that forms the first areas 210D of the side surface 210C and the first surface 210A. In some embodiments, the display 201 may have a corner formed in substantially the same shape as that of the adjacent outer periphery of the front plate 202. In another embodiment (not illustrated), in order to increase the area of exposure of the display 201, the interval between the outer periphery of the display 201 and the outer periphery of the front plate 202 may be formed to be substantially identical.

In another embodiment (not illustrated), a recess or an opening may be formed in a part of the screen display area of the display 201, and at least one of an audio module 214, a sensor module 204, a camera module 205, and a light-emitting element 206 may be included and aligned with the recess or the opening. In another embodiment (not illustrated), on the back surface of the screen display area of the display 201, at least one of an audio module 214, a sensor module 204, a camera module 205, a fingerprint sensor 216, and a light-emitting element 206 may be included. In another embodiment (not illustrated), the display 201 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 204 and 219 and/or at least a part of the key input device 217 may be arranged in the first areas 210D and/or the second areas 210E.

The audio modules 203, 207, and 214 may include a microphone hole 203 and speaker holes 207 and 214. A microphone for acquiring an external sound may be arranged in the microphone hole 203, and a plurality of microphones may be arranged therein such that the direction of a sound can be sensed in some embodiments. The speaker holes 207 and 214 may include an outer speaker hole 207 and a speech receiver hole 214. In some embodiments, the speaker holes 207 and 214 and the microphone hole 203 may be implemented as a single hole, or a speaker may be included (for example, a piezoelectric speaker) without the speaker holes 207 and 214.

The sensor modules 204, 216, and 219 may generate an electric signal or a data value corresponding to the internal operating condition of the electronic device 200 or the external environment condition thereof. The sensor modules 204, 216, and 219 may include, for example, a first sensor module 204 (for example, a proximity sensor) arranged on the first surface 210A of the housing 210, and/or a second sensor module (not illustrated) (for example, a fingerprint sensor), and/or a third sensor module 219 (for example, an HRM sensor) arranged on the second surface 210B of the housing 210, and/or a fourth sensor module 216 (for example, a fingerprint sensor). The fingerprint sensor may be arranged not only on the first surface 210A (for example, the display 201) of the housing 210, but also on the second surface 210B thereof. The electronic device 200 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 204.

The camera modules 205, 212, and 213 may include a first camera device 205 arranged on the first surface 210A of the electronic device 200, a second camera device 212 arranged on the second surface 210B thereof, and/or a flash 213. The camera devices 205 and 212 may include a single lens or a plurality of lenses, an image sensor, and/or an image signal processor. The flash 213 may include, for example, a light-emitting diode or a xenon lamp. In some embodiments, two or more lenses (an infrared camera, a wide-angle lens, and a telephoto lens) and image sensors may be arranged on a single surface of the electronic device 200.

The key input device 217 may be arranged on the side surface 210C of the housing 210. In another embodiment, the electronic device 200 may not include a part of the above-mentioned key input device 217 or the entire key input device 217, and the key input device 217 (not included) may be implemented in another type, such as a soft key, on the display 201. In some embodiments, the key input device may include a sensor module 216 arranged on the second surface 210B of the housing 210.

The light-emitting element 206 may be arranged on the first surface 210A of the housing 210, for example. The light-emitting element 206 may provide information regarding the condition of the electronic device 200 in a light type, for example. In another embodiment, the light-emitting element 206 may provide a light source that interworks with operation of the camera module 205, for example. The light-emitting element 206 may include, for example, an LED, an IR LED, and a xenon lamp.

The connector holes 208 and 209 may include a first connector hole 208 capable of containing a connector (for example, a USB connector) for transmitting/receiving power and/or data to/from an external electronic device, and/or a second connector hole (for example, an earphone jack) 209 capable of containing a connector for transmitting/receiving an audio signal to/from the external electronic device.

Figure 3:
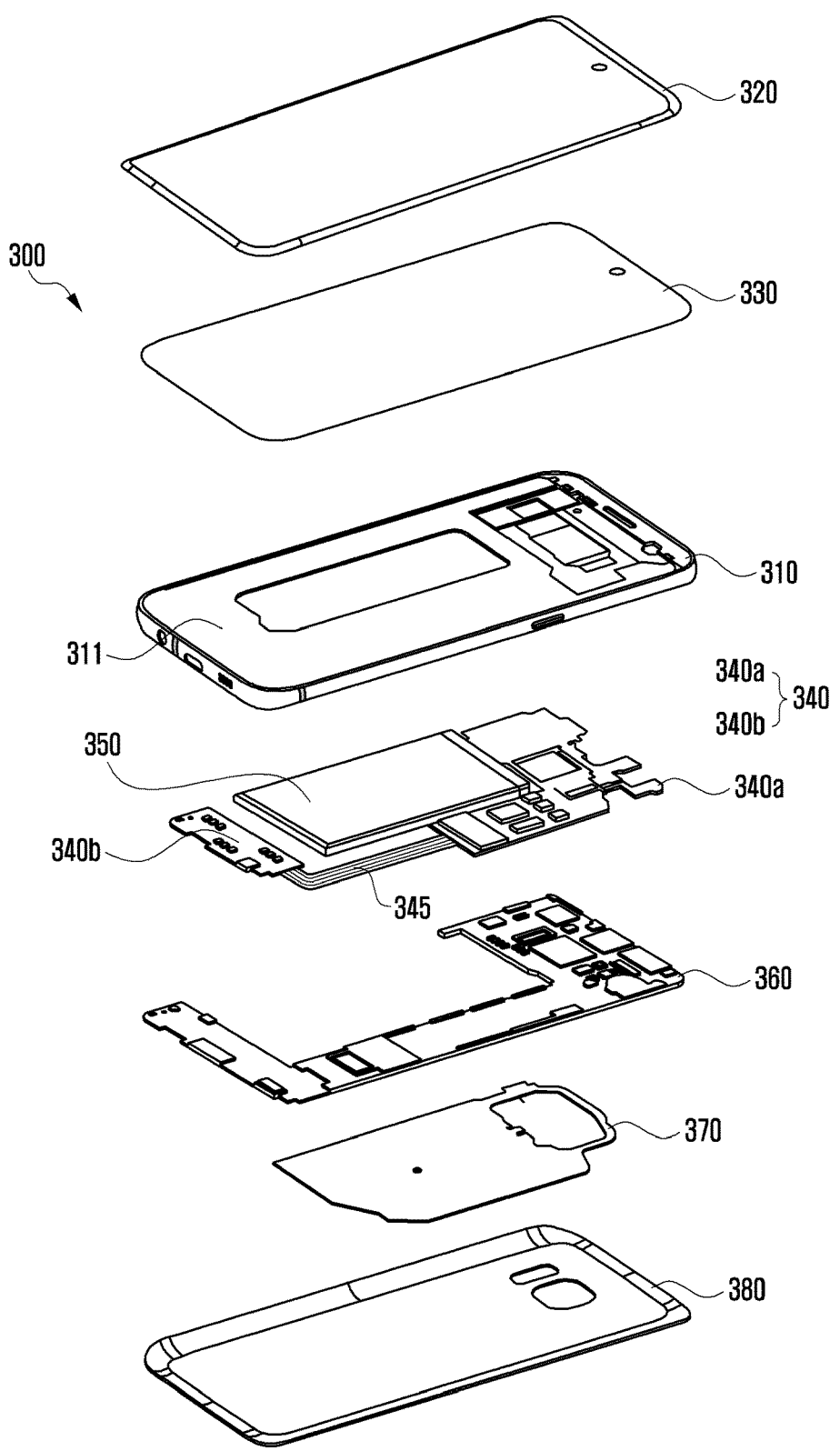
FIG. 3 is an exploded perspective view of an electronic device according to certain embodiments of the disclosure.

FIG. 3 is an exploded perspective view of an electronic device according to certain embodiments of the disclosure.

Referring to FIG. 3, the electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 101 or 200 of FIG. 1 to FIG. 2B, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

According to certain embodiments, the printed circuit board 340 may include a first PCB 340a and/or a second PCB 340b. For example, the first PCB 340a and the second PCB 340b may be disposed to be spaced apart from each other and may be electrically connected using a connection member 345 (e.g., a coaxial cable and/or FPCB). As another example, the printed circuit board 340 may include a structure formed by stacking a plurality of printed circuit boards (PCBs). The printed circuit board 340 may include an interposer structure. The printed circuit board 340 may be implemented in the form of a flexible printed circuit board (FPCB) and/or a rigid printed circuit board (PCB).

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

According to certain embodiments, the side member 310 (e.g., a housing or a side bezel structure) may form the exterior of the electronic device 300. The side member 310 may at least partially include a non-conductive material. At least a portion of the side member 310 may include, for example, a ceramic material having a high permittivity (e.g., the permittivity of about 7 to 25).

Figure 4:
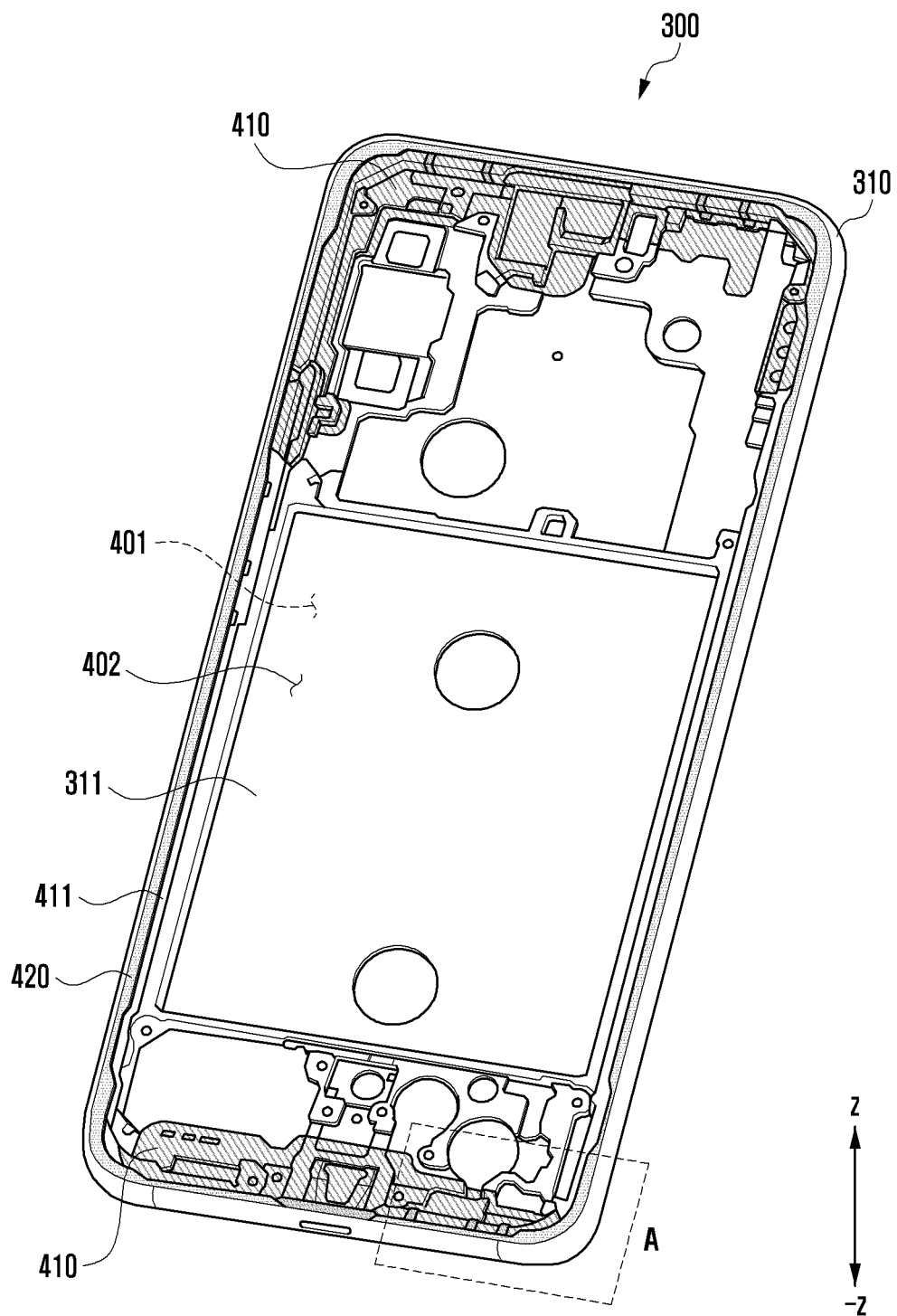
FIG. 4 schematically illustrates a portion of an electronic device according to certain embodiments of the disclosure.
Figure 5:
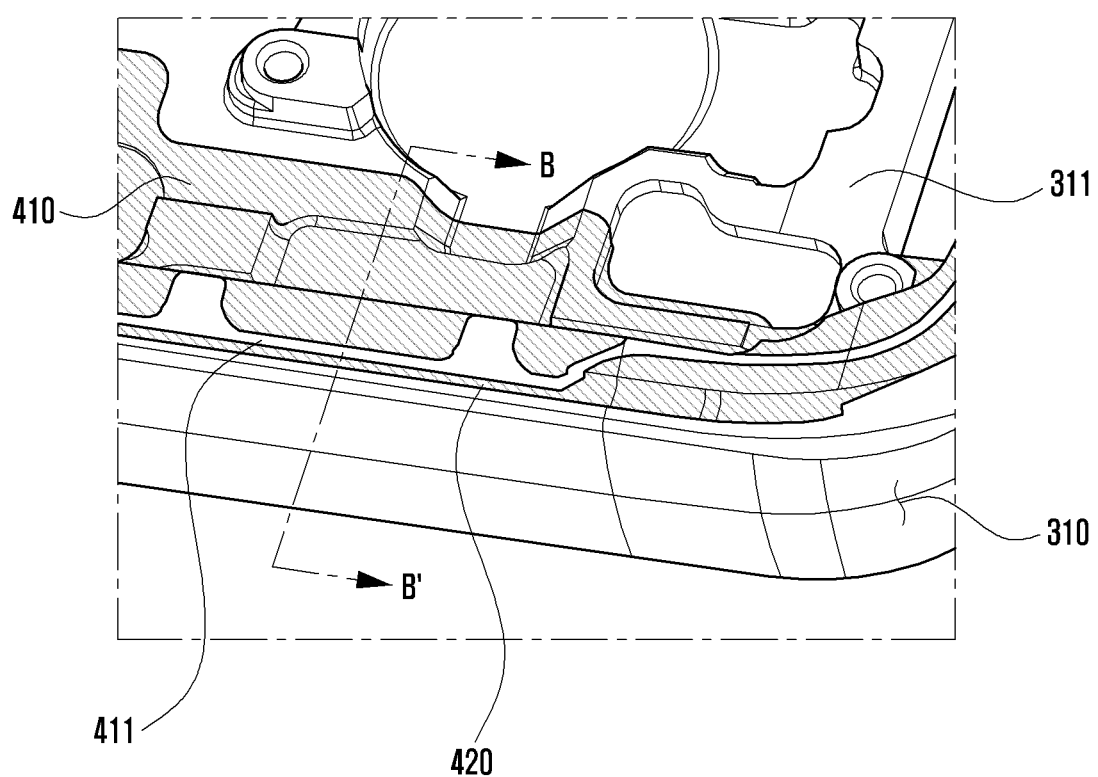
FIG. 5 is an enlarged view schematically illustrating an embodiment of region A of an electronic device illustrated in FIG. 4, according to certain embodiments of the disclosure.

FIG. 4 schematically illustrates a portion of an electronic device according to certain embodiments of the disclosure. FIG. 5 is an enlarged view schematically illustrating an embodiment of region A of an electronic device illustrated in FIG. 4, according to certain embodiments of the disclosure.

According to an embodiment, the electronic device 300 of FIG. 4 may be a view when the electronic device illustrated in FIG. 3 is viewed in one direction (e.g., the z-axis direction).

The electronic device 300 of FIGS. 4 and 5 may include the embodiments described with respect to the electronic device 101 of FIG. 1, the electronic device 200 of FIGS. 2A and 2B, and/or the electronic device 300 of FIG. 3. In the description of FIGS. 4 and 5, the same reference numerals are assigned to elements substantially the same or similar to those of the embodiment of the electronic device 300 illustrated in FIG. 3, and repeated descriptions may be omitted.

In one embodiment, although the embodiment related to the electronic device 300 of FIGS. 4 and 5 has been described with respect to the bar-type electronic device, the disclosure is not limited thereto, and may also be applied to a foldable type, a rollable type, a sliding type, a wearable type, and/or an electronic device such as a tablet PC or a notebook PC.

Referring to FIGS. 4 and 5, the electronic device 300 according to certain embodiments of the disclosure may include a side member 310, a support member 311, a first non-conductive member 410, a conductive pattern 411, and/or a second non-conductive member 420.

According to an embodiment, the side member 310 may form the exterior of the electronic device 300. The side member 310 may include a non-conductive material. The side member 310 may include, for example, a ceramic material having a high permittivity (e.g., the permittivity of about 7 to 25).

According to certain embodiments, the side member 310 may include an insulator (or dielectric) at least partially including polyimide, plastic, and/or polymer.

According to an embodiment, the support member 311 (e.g., the first support member 311 of FIG. 3) may be disposed inside the electronic device 300 to be coupled to the side member 310 or may be formed integrally with the side member 310. In an embodiment, the support member 311 may extend from the side member 310 toward the inner space of the electronic device 300. The support member 311 may be formed of, for example, a metal material (e.g., aluminum) and/or a non-metal material (e.g., a polymer).

According to certain embodiments, the support member 311 may include a first surface 401 and a second surface 402.

In an embodiment, the support member 311 may support at least a portion of the display (e.g., the display 330 of FIG. 3) by using the first surface 401 (e.g., the −z-axis direction). In another embodiment, the support member 311 may support at least a portion of a printed circuit board (e.g., the printed circuit board 340 of FIG. 3) and/or a battery (e.g., the battery 350 of FIG. 3) by using the second surface 402 (e.g., the z-axis direction). According to certain embodiments, for example, the processor 120 and/or the wireless communication module 192 illustrated in FIG. 1 may be disposed on the printed circuit board 340.

According to certain embodiments, the support member 311 may be integrally formed with the conductive pattern 411. For example, the support member 311 may include a conductive pattern 411. For example, the conductive pattern 411 may be formed along the outer edge of the support member 311. In an embodiment, a metal material (e.g., aluminum) may be machined by applying a die casting or a computerized numerical control (CNC) method thereto such that the support member 311 and/or the conductive pattern 411 have predetermined shapes.

According to an embodiment, the first non-conductive member 410 (e.g., a first injection-molded product) may be disposed on at least a portion of the support member 311. The first non-conductive member 410 may be disposed, for example, on the upper portion and/or the lower portion of the support member 311. The first non-conductive member 410 may include, for example, a polymer material. The first non-conductive member 410 may segment or separate the conductive pattern 411 from the metal material of the support member 311 such that the conductive pattern 411 functions or operates as an antenna radiator.

According to certain embodiments, the first non-conductive member 410 may be coupled to the support member 311 via an insert-injection process. The first non-conductive member 410 may be disposed inside the side member 310. For example, the first non-conductive member 410 may be disposed along an inner periphery of the side member 310.

According to an embodiment, the conductive pattern 411 (e.g., an antenna radiator) may be at least partially disposed between the first non-conductive member 410 and the side member 310. In an embodiment, the conductive pattern 411 may be disposed along an inner periphery of the side member 310. The conductive pattern 411 may be electrically coupled or connected to a wireless communication module (e.g., the wireless communication module 192 of FIG. 1) and/or a processor (e.g., the processor 120 of FIG. 1) disposed on a printed circuit board (e.g., the printed circuit board 340 of FIG. 3) and operate as an antenna (e.g., an antenna radiator).

According to certain embodiments, the conductive pattern 411 may be at least partially disposed between the first non-conductive member 410 and the second non-conductive member 420. The conductive pattern 411 may be disposed to be spaced apart from another electronic component (e.g., the display 330 of FIG. 3 or 6) by a predetermined distance.

According to an embodiment, the second non-conductive member 420 (e.g., a second injection-molded product) may be disposed between the conductive pattern 411 and the side member 310. The second non-conductive member 420 may include, for example, a polymer material.

According to certain embodiments, the second non-conductive member 420 may be inserted in the form of a resin between the side member 310 and the conductive pattern 411 in a mold and may bond the side member 310 and the conductive pattern 411 to each other. For example, the second non-conductive member 420 may be inserted in the form of a resin between the side member 310 and the conductive pattern 411 and may be molded while bonding the inner side of the side member 310 and the outer side of the conductive pattern 411.

Figure 6:
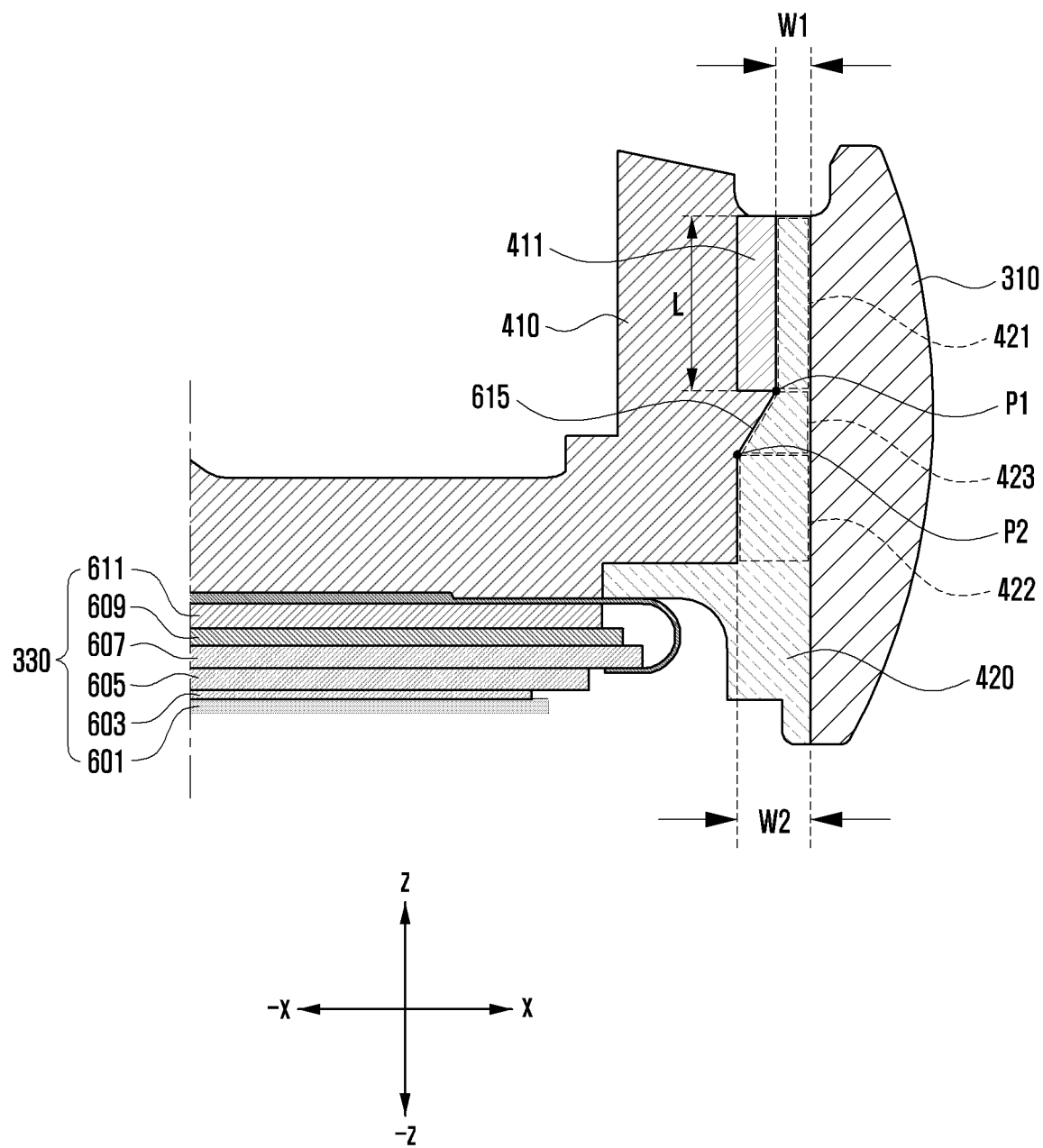
FIG. 6 is a cross-sectional view schematically illustrating an embodiment of a portion B-B' of an electronic device illustrated in FIG. 5, according to certain embodiments of the disclosure.

FIG. 6 is a cross-sectional view schematically illustrating an embodiment of a portion B-B' of an electronic device illustrated in FIG. 5, according to certain embodiments of the disclosure.

As shown in FIG. 6, the electronic device 300 according to certain embodiments of the disclosure may include the side member 310 disposed on the outermost side of the electronic drive.

According to an embodiment, the second non-conductive member 420 may be disposed between the side member 310 and the conductive pattern 411 and the first non-conductive member 410.

According to certain embodiments, at least a portion of the conductive pattern 411 may be disposed between the first non-conductive member 410 and the second non-conductive member 420.

According to an embodiment, the z-axis directional length (L) of the conductive pattern 411 may be shorter than the z-axis directional length of the first non-conductive member 410 and/or the z-axis directional length of the second non-conductive member 420. In an embodiment, at least a portion of the conductive pattern 411 may be disposed to be surrounded by the first non-conductive member 410 and the second non-conductive member 420.

According to certain embodiments, since the z-axis directional length (L) of the conductive pattern 411 may be shorter than the z-axis directional lengths of the first non-conductive member 410 and the second non-conductive member 420, the conductive pattern 411 may be spaced apart from the display 330 by a specified distance in the z-axis direction while being disposed between the first non-conductive member 410 and the second non-conductive member 420.

According to certain embodiments, a first inclined surface 615 may be formed on at least a portion of the first non-conductive member 410 where the first non-conductive member 410 and the second non-conductive member 420 face each other. For example, the first inclined surface 615 formed on the first non-conductive member 410 may extend from a first point (P1) to a second point (P2) such that the first inclined surface 615 is angled with respect to the z-axis directional length (L). In an embodiment, the first inclined surface 615 formed on the first non-conductive member 410 may be formed at the first point (P1) positioned in the −z axis direction of the conductive pattern 411 toward a direction between the −x axis and the −z axis. In an embodiment, the second point (P2) may be at a position that is spaced apart from the first point (P1) in the −x-axis direction and the −z-axis direction. For example, the second point (P2) may be located farther than the first point (P1) from the side member 310. As another example, the second point (P2) may be located farther than the first point (P1) from the conductive pattern 411.

According to certain embodiments, a first width (W1) of the first portion 421 of the second non-conductive member 420 positioned between the side member 310 and the conductive pattern 411 may be narrower than a second width (W2) of the second portion 422 of the second non-conductive member 420 positioned between the side member 310 and the first non-conductive member 410. The second width (W2) of the second portion 422 of the second non-conductive member 420 may be wider than the first width (W1) of the first portion 421. A third portion 423 of the second non-conductive member 420 on which the first inclined surface 615 formed on the first non-conductive member 410 is disposed may be positioned between the first portion 421 and the second portion 422. For example, a portion of the third portion 423 adjacent to the first portion 421 of the second non-conductive member 420 may have the first width (W1) and the other portion of the third portion 423 adjacent to the second portion 422 may have the second width (W2). For example, the first width (W1) may be about 0.4 mm to 0.6 mm, and the second width (W2) may be about 0.8 mm to 0.9 mm.

According to certain embodiments, when the first width (W1) between the side member 310 and the conductive pattern 411 is reduced, for example, from about 0.8 mm to 0.9 mm to about 0.4 mm to 0.6 mm, a space (e.g., the first width (W1)) into which the resin type second non-conductive member 420 flows may be reduced. The second non-conductive member 420 may be incompletely molded due to the internal pressure increasing during injection when the resin type second non-conductive member 420 flows therethrough if the resin were inhibited from fully flowing by the reduced space.

According to certain embodiments, the resin type second non-conductive member 420 smoothly flows between the side member 310 and the conductive pattern 411 by the reduced length in the −z-axis direction of the conductive pattern 411 disposed between the first non-conductive member 410 and the second non-conductive member 420 and by the first inclined surface 615 of the first non-conductive member 410 formed on the third portion 423 of the second non-conductive member 420, thereby preventing the incomplete molding of the second non-conductive member 420. In this case, the width of the second non-conductive member 420 in the −z-axis direction may be wider than the first width (W1) as in the second width (W2). In an embodiment, it is described that the resin type second non-conductive member 420 smoothly flows between the side member 310 and the conductive pattern 411 by using the first inclined surface 615 formed on the first non-conductive member 410. However, as long as the second non-conductive member 420 can smoothly flow between the side member 310 and the conductive pattern 411, the first inclined surface 615 is not limited to the inclined surface, and may be implemented in inclined concave and convex and/or a stepped shape.

According to an embodiment, the display 330 may be disposed in the −z-axis direction of the first non-conductive member 410. The display 330 may be located on the first surface 401 (e.g., the −z-axis direction) of the support member 311.

According to certain embodiments, the display 330 may include a protection layer 601 (e.g., a window layer), an adhesive layer 603, a polarizer 605 (e.g., a polarizing film), a display panel 607, a polymer member 609, and/or a metal sheet layer 611 (e.g., a ground layer).

According to an embodiment, the adhesive layer 603 is illustrated as being disposed between the protection layer 601 and the polarizer 605, but the adhesive layer 603 may be disposed between the polarizer 605 and the display panel 607, between the display panel 607 and the polymer member 609, and between the polymer member 609 and the metal sheet layer 611, respectively.

According to certain embodiments, the adhesive layer 603 may include at least one of an optical clear adhesive (OCA), a pressure sensitive adhesive (PSA), a heat-reactive adhesive, a general adhesive, and a double-sided tape.

According to certain embodiments, the protection layer 601 may include a polymer layer and/or a glass layer laminated with the polymer layer. The protection layer 601 may include, as a polymer layer, polyethylene terephthalate (PET) or polyimide (PI), and may include, as a glass layer, an ultra thin glass (UTG). The protection layer 601 may be formed of a glass layer (e.g., an UTG) and a polymer layer (PET or PI) laminated on the glass layer and responding to the external environment.

According to certain embodiments, the polarizer 605 may be replaced with a color filter and a black matrix (BM).

According to certain embodiments, the polymer member 607 may include a cushioning member configured to absorb an impact from the outside of the electronic device 300 to prevent damage and/or breakage to the display 330. In some embodiments, the polymer member 607 may be disposed under the metal sheet layer 611.

According to certain embodiments, the metal sheet layer 611 may advantageously reinforce the rigidity of the electronic device 300. The metal sheet layer 611 may shield noise around the electronic device 300. The metal sheet layer 611 may be used to dissipate heat emitted from a heat dissipating component (e.g., the processor 120 and the memory 130 of FIG. 1) mounted on a printed circuit board (e.g., the printed circuit board 340 of FIG. 3). The metal sheet layer 611 may include at least one of steel use stainless (SUS) (e.g., stainless steel (STS)), Cu, Al, or CLAD (e.g., a stacking member formed by alternately arranging SUS and Al). In another embodiment, the metal sheet layer 611 may include other alloy materials. The metal sheet layer 611 may perform a ground function of the display 330.

According to certain embodiments, the display 330 may also further include a detection member (not shown) configured to detect an input by an electromagnetic induction type writing member (e.g., a stylus pen). For example, the detection member may include a digitizer. A detection member (e.g., a digitizer) may be disposed between the display panel 607 and at least one polymer member 609. In another embodiment, the detection member may be disposed under the metal sheet layer 611, and the metal sheet layer 611 may also have a structural shape (e.g., multiple openings) capable of detecting a signal (e.g., a resonance frequency) of the electronic pen by the detection member.

According to certain embodiments, the display 330 may also include at least one functional member (not shown) disposed between the polymer member 609 and the metal sheet layer 611. For example, the functional member may include, for the purpose of dissipating heat, a graphite sheet, a force touch FPCB, a fingerprint sensor FPCB, a communication antenna radiator, a heat dissipation sheet, a conductive/non-conductive tape, and/or an open cell sponge.

Figure 7:
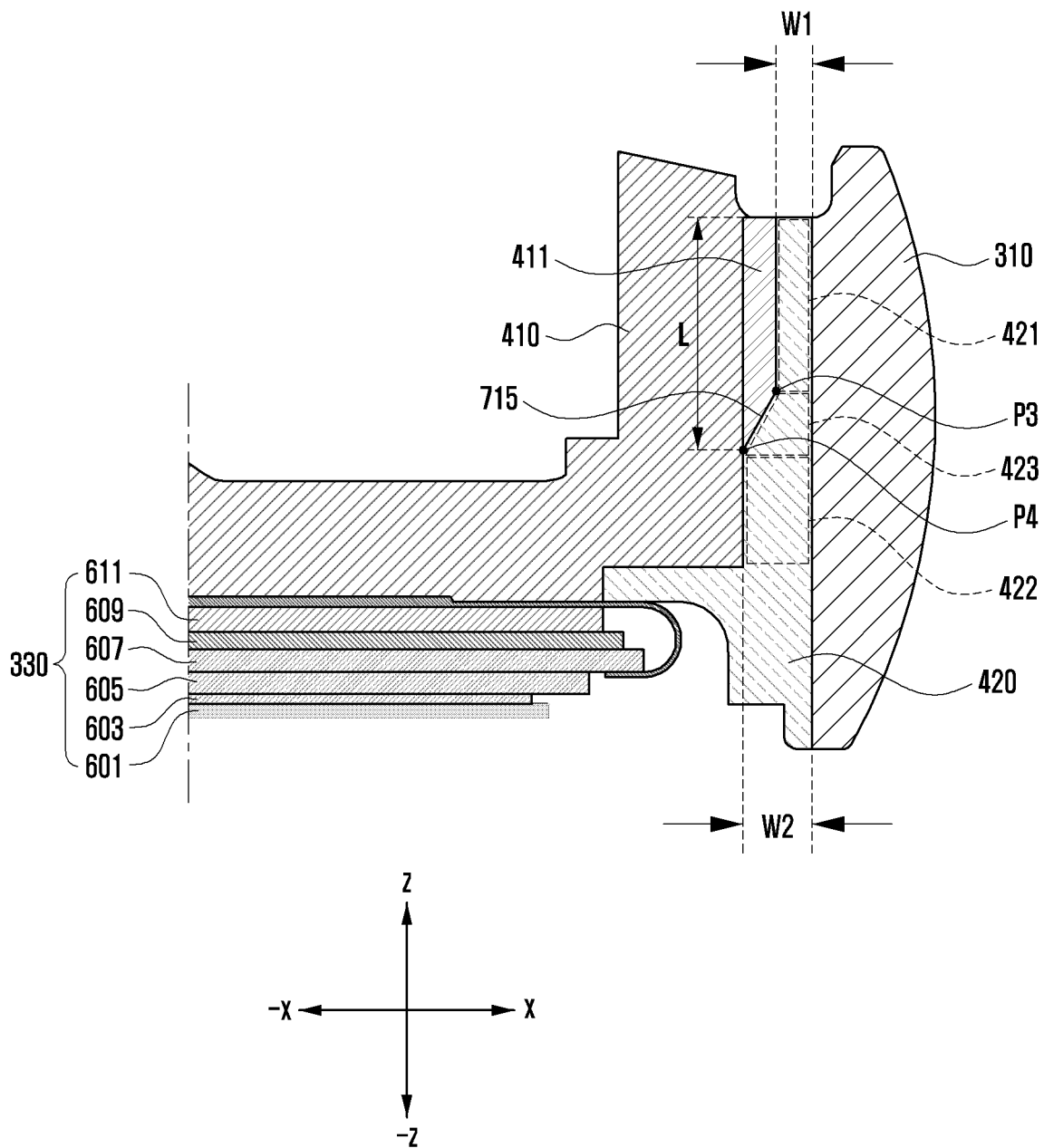
FIG. 7 is a cross-sectional view schematically illustrating certain embodiments of a portion B-B' of an electronic device illustrated in FIG. 5, according to certain embodiments of the disclosure.

FIG. 7 is a cross-sectional view schematically illustrating certain embodiments of a portion B-B' of an electronic device illustrated in FIG. 5, according to certain embodiments of the disclosure.

In the description of FIG. 7, the same reference numerals are assigned to elements substantially the same as those of the embodiment of the electronic device 300 illustrated in FIGS. 4 to 6 described above, and repeated descriptions may be omitted.

Referring to FIG. 7, the electronic device 300 according to certain embodiments of the disclosure may include the side member 310 disposed on the outermost side thereof.

According to an embodiment, the second non-conductive member 420 may be disposed between the side member 310 and the conductive pattern 411 and the first non-conductive member 410.

According to certain embodiments, at least a portion of the conductive pattern 411 may be disposed between the first non-conductive member 410 and the second non-conductive member 420.

According to an embodiment, the z-axis directional length (L) of the conductive pattern 411 may be shorter than the z-axis directional lengths of the first non-conductive member 410 and the second non-conductive member 420. In an embodiment, at least a portion of the conductive pattern 411 may be disposed to be surrounded by the first non-conductive member 410 and the second non-conductive member 420.

According to certain embodiments, since the z-axis directional length (L) of the conductive pattern 411 may be shorter than the z-axis directional lengths of the first non-conductive member 410 and the second non-conductive member 420, the conductive pattern 411 may be spaced apart from the display 330 by a specified distance in the z-axis direction while being disposed between the upper portion of the first non-conductive member 410 and the upper portion of the second non-conductive member 420.

According to certain embodiments, a first inclined surface 715 may be formed on at least a portion of the conductive pattern 411 where the conductive pattern 411 and the second non-conductive member 420 face each other. For example, the first inclined surface 715 formed on the conductive pattern 411 may extend from a third point (P3) to a fourth point (P4). In an embodiment, the first inclined surface 715 formed on the conductive pattern 411 may be disposed at one edge (e.g., the third point (P3)) in the −z axis direction of the conductive pattern 411 toward a direction between the −x axis and the −z axis. The third point (P3) and the fourth point (P4) may be, for example, corners positioned in the −z-axis direction of the conductive pattern 411. In an embodiment, the fourth point (P4) may be at a position that is spaced from the third point (P3) in the −x-axis direction and the −z-axis direction. For example, the fourth point (P4) may be located farther than the third point (P3) from the side member 310. As another example, the third point (P3) may be located farther than the fourth point (P4) from the display 330.

According to certain embodiments, a first width (W1) of a first portion 421 of the second non-conductive member 420 positioned between the side member 310 and the conductive pattern 411 may be narrower than a second width (W2) of a second portion 422 of the second non-conductive member 420 positioned between the side member 310 and the first non-conductive member 410. The second width (W2) of the second portion 422 of the second non-conductive member 420 may be wider than the first width (W1) of the first portion 421. A third portion 423 of the second non-conductive member 420 on which the first inclined surface 715 formed on the conductive pattern 411 is disposed may be positioned between the first portion 421 and the second portion 422. For example, a portion of the third portion 423 may have the first width (W1) and the other portion of the third portion 423 may have the second width (W2). For example, the first width (W1) may be about 0.4 mm to 0.6 mm, and the second width (W2) may be about 0.8 mm to 0.9 mm.

According to certain embodiments, when the first width (W1) between the side member 310 and the conductive pattern 411 is reduced, for example, from about 0.8 mm to 0.9 mm to about 0.4 mm to 0.6 mm, a space (e.g., the first width (W1)) into which the resin type second non-conductive member 420 flows may be reduced. The second non-conductive member 420 may be incompletely molded due to the internal pressure increasing during injection when the resin type second non-conductive member 420 flows therethrough if the resin were inhibited from fully flowing by the reduced space and the increased pressure.

According to certain embodiments, the resin type second non-conductive member 420 smoothly flows between the side member 310 and the conductive pattern 411 by the reduced length in the z-axis direction of the conductive pattern 411 may be partially disposed between the first non-conductive member 410 and the second non-conductive member 420 and by the first inclined surface 715 of the conductive pattern 411 formed on the third portion 423 of the second non-conductive member 420, thereby preventing the incomplete molding of the second non-conductive member 420. In this case, the width of the second non-conductive member 420 in the −z-axis direction may be wider than the first width (W1) as in the second width (W2).

In an embodiment, the resin type second non-conductive member 420 may smoothly flow between the side member 310 and the conductive pattern 411 by using the first inclined surface 715 formed on the conductive pattern 411. The first inclined surface 715 is not limited to be configured to be an inclined surface as depicted in FIG. 7, and may instead be implemented in inclined concave and convex and/or a stepped shape.

Figure 8:
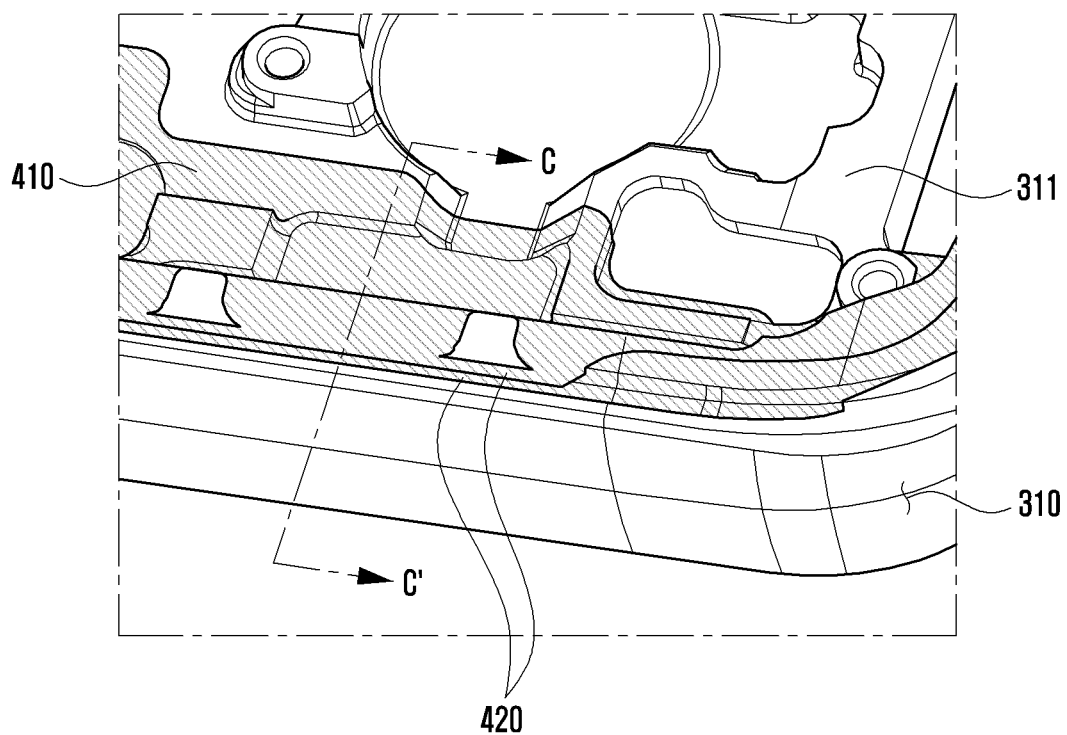
FIG. 8 is an enlarged view schematically illustrating certain embodiments of region A of an electronic device illustrated in FIG. 4, according to certain embodiments of the disclosure.

FIG. 8 is an enlarged view schematically illustrating certain embodiments of region A of an electronic device illustrated in FIG. 4, according to certain embodiments of the disclosure. FIGS. 9 to 12 are cross-sectional views schematically illustrating certain embodiments of a portion C-C' of an electronic device illustrated in FIG. 8, according to certain embodiments of the disclosure.

In the following description, the same reference or like reference numerals are assigned to the elements substantially the same as those of the embodiment of the electronic device 300 illustrated in FIGS. 4 to 7 described above, and repeated descriptions may be omitted.

Referring to FIG. 8, the electronic device 300 according to certain embodiments of the disclosure may include at least a portion of the upper end of the conductive pattern 411 which is not exposed upward (e.g., the z-axis direction), compared to the electronic device illustrated in FIG. 7.

Figure 9:
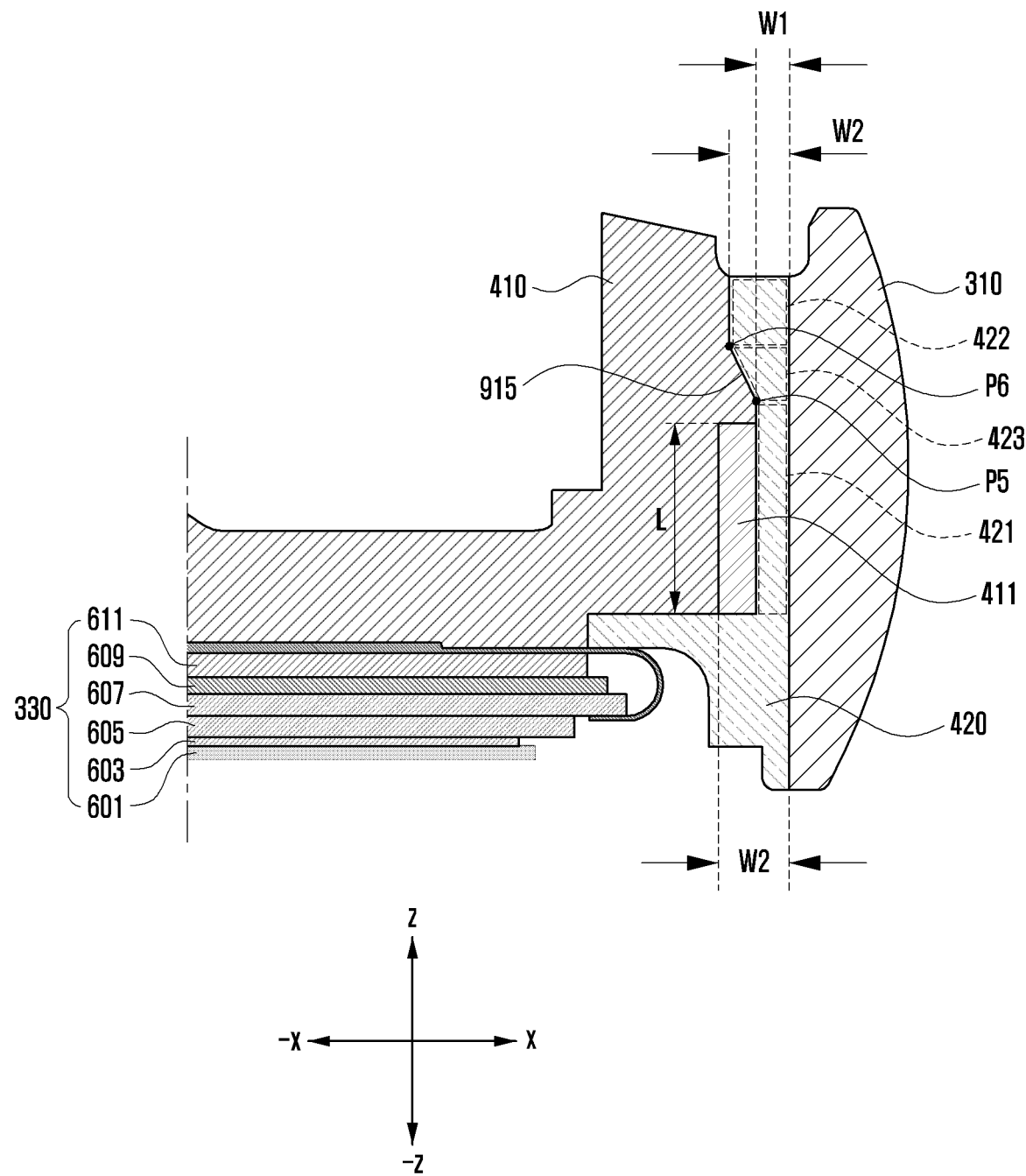
FIGS. 9 to 12 are cross-sectional views schematically illustrating certain embodiments of a portion C-C' of an electronic device illustrated in FIG. 8, according to certain embodiments of the disclosure.

Referring to FIG. 9, the electronic device 300 according to certain embodiments of the disclosure may include the side member 310 disposed on the outermost side thereof.

According to an embodiment, the second non-conductive member 420 may be disposed between the side member 310 and the conductive pattern 411 and the first non-conductive member 410.

According to certain embodiments, at least a portion of the conductive pattern 411 may be disposed between the first non-conductive member 410 and the second non-conductive member 420.

According to an embodiment, the z-axis directional length (L) of the conductive pattern 411 may be shorter than the z-axis directional lengths of the first non-conductive member 410 and the second non-conductive member 420. In an embodiment, the conductive pattern 411 may be disposed to be surrounded by the first non-conductive member 410 and the second non-conductive member 420.

According to certain embodiments, since the z-axis directional length (L) of the conductive pattern 411 may be shorter than the z-axis directional lengths of the first non-conductive member 410 and the second non-conductive member 420, the conductive pattern 411 may be spaced apart from the display 330 by a specified distance in the +z-axis direction while being disposed between the first non-conductive member 410 and the second non-conductive member 420.

According to certain embodiments, a second inclined surface 915 may be formed on at least a portion of the first non-conductive member 410 where the first non-conductive member 410 and the second non-conductive member 420 face each other. For example, the second inclined surface 915 may extend from a fifth point (P5) to a sixth point (P6). In an embodiment, the second inclined surface 915 formed on the first non-conductive member 410 may be disposed at the fifth point (P5) positioned in the +z axis direction of the conductive pattern 411 toward the direction between the −x axis and the +z axis. In an embodiment, the sixth point (P6) may be a position moved from the fifth point (P5) in the −x-axis direction and the +z-axis direction. For example, the sixth point (P6) may be located farther than the fifth point (P5) from the side member 310. In another example, the sixth point (P6) may be located farther than the fifth point (P5) from the conductive pattern 411.

According to certain embodiments, a first width (W1) of a first portion 421 of the second non-conductive member 420 positioned between the side member 310 and the conductive pattern 411 may be narrower than a second width (W2) of a second portion 422 of the second non-conductive member 420 positioned between the side member 310 and the first non-conductive member 410. The second width (W2) of the second portion 422 of the second non-conductive member 420 may be wider than the first width (W1) of the first portion 421. A third portion 423 of the second non-conductive member 420 on which the second inclined surface 915 formed on the first non-conductive member 410 is positioned may be positioned between the first portion 421 and the second portion 422. For example, a portion of the third portion 423 of the second non-conductive member 420 may have the first width (W1) and the other portion of the third portion 423 may have the second width (W2). For example, the first width (W1) may be about 0.4 mm to 0.6 mm, and the second width (W2) may be about 0.8 mm to 0.9 mm.

According to certain embodiments, when the first width (W1) between the side member 310 and the conductive pattern 411 is reduced, for example, from about 0.8 mm to 0.9 mm to about 0.4 mm to 0.6 mm, a space (e.g., the first width (W1)) into which the resin type second non-conductive member 420 flows may be reduced. In this case, a defect may occur when the resin type second non-conductive member 420 flows between the side member 310 and the conductive pattern 411, and the second non-conductive member 420 may be incompletely molded due to the internal pressure increasing during injection.

According to certain embodiments, the second width (W2) (e.g., about 0.8 mm to 0.9 mm) is formed between the side member 310 and the first non-conductive member 410 by the reduced length in the −z-axis direction of the conductive pattern 411 partially disposed between the first non-conductive member 410 and the second non-conductive member 420 and by the second inclined surface 915 of the first non-conductive member 410 formed on the third portion 423 of the second non-conductive member 420, and accordingly, the resin type second non-conductive member 420 may smoothly flow between the side member 310 and the conductive pattern 411, and the incomplete molding of the second non-conductive member 420 may be inhibited.

Figure 10:
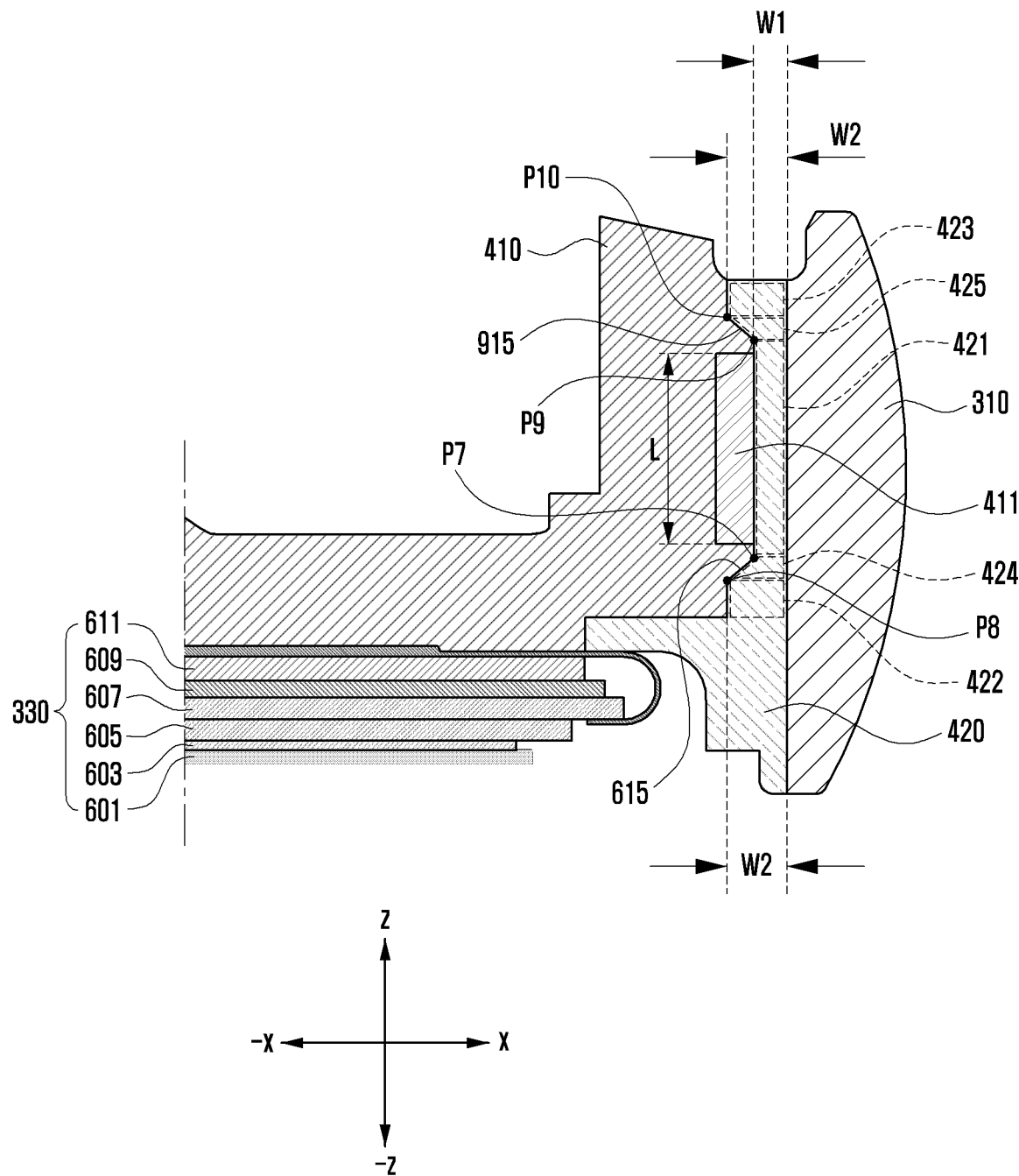

Referring to FIG. 10, the electronic device 300 according to certain embodiments of the disclosure may include the side member 310 disposed on the outermost side thereof.

According to an embodiment, the second non-conductive member 420 may be disposed between the side member 310 and the conductive pattern 411 and the first non-conductive member 410.

According to certain embodiments, at least a portion of the conductive pattern 411 may be disposed between the first non-conductive member 410 and the second non-conductive member 420.

According to an embodiment, the z-axis directional length (L) of the conductive pattern 411 may be shorter than the z-axis directional lengths of the first non-conductive member 410 and the second non-conductive member 420. In an embodiment, at least a portion of the conductive pattern 411 may be disposed to be surrounded by the first non-conductive member 410 and the second non-conductive member 420.

According to certain embodiments, since the z-axis directional length (L) of the conductive pattern 411 may be shorter than the z-axis directional lengths of the first non-conductive member 410 and the second non-conductive member 420, the conductive pattern 411 may be spaced apart from the display 330 by a specified distance in the z-axis direction while being disposed between the upper and lower portions of the first non-conductive member 410 and between the upper and lower portions of the second non-conductive member 420.

According to certain embodiments, a first inclined surface 615 and a second inclined surface 915 may be formed on at least a portion of the first non-conductive member 410 where the first non-conductive member 410 and the second non-conductive member 420 face each other. The first inclined surface 615 formed on first non-conductive member 410 may be formed adjacent to one end in the −z-axis direction of the conductive pattern 411. The second inclined surface 915 may be formed adjacent to the other end in the z-axis direction of the conductive pattern 411. In an embodiment, the first inclined surface 615 may be formed at a seventh point (P7) positioned in the −z axis direction of the conductive pattern 411 toward a direction between the −x axis and the −z axis. In an embodiment, an eighth point (P8) may be a position moved from the seventh point (P7) in the −x-axis direction and the −z-axis direction. For example, the eighth point (P8) may be located farther than the seventh point (P7) from the side member 310. Alternatively, the eighth point (P8) may be located farther than the seventh point (P7) from the conductive pattern 411 or the second inclined surface 915 may be formed to extend from a ninth point (P9) to a tenth point (P10).

In an embodiment, the second inclined surface 915 may be formed at the ninth point (P9) positioned in the z-axis direction of the conductive pattern 411 toward a direction between the −x axis and the +z axis. In an embodiment, the tenth point P10 may be a position moved from the ninth point (P9) in the −x-axis direction and the +z-axis direction. For example, the tenth point (P10) may be located farther than the ninth point (P9) from the side member 310. In another example, the tenth point (P10) may be located farther than the ninth point (P9) from the conductive pattern 411.

According to certain embodiments, a first width (W1) of a first portion 421 of the second non-conductive member 420 positioned between the side member 310 and the conductive pattern 411 may be narrower than second widths (W2) of a second portion 422 and a third portion 423 of the second non-conductive member 420 positioned between the side member 310 and the first non-conductive member 410. The second widths (W2) of the second portion 422 and the third portion 423 of the second non-conductive member 420 may be wider than the first width (W1) of the first portion 421. A fourth portion 424 of the second non-conductive member 420 on which the first inclined surface 615 formed on the first non-conductive member 410 is positioned may be disposed between the first portion 421 and the second portion 422. A fifth portion 425 of the second non-conductive member 420 on which the second inclined surface 915 formed on the first non-conductive member 410 is positioned may be disposed between the first portion 421 and the third portion 423. For example, a portion of the fourth portion 424 and a portion of the fifth portion 425 may have a first width (W1), and the other portion of the fourth portion 424 and the other portion of the fifth portion 425 may have a second width (W2). For example, the first width (W1) may be about 0.4 mm to 0.6 mm, and the second width (W2) may be about 0.8 mm to 0.9 mm.

According to certain embodiments, when the first width (W1) between the side member 310 and the conductive pattern 411 is reduced, for example, from about 0.8 mm to 0.9 mm to about 0.4 mm to 0.6 mm, a space (e.g., the first width (W1)) into which the resin type second non-conductive member 420 flows may be reduced. The second non-conductive member 420 may be incompletely molded due to the internal pressure increasing during injection when the resin type second non-conductive member 420 flows therethrough if the resin were inhibited from fully flowing by the reduced space. According to certain embodiments, the second width (W2) (e.g., about 0.7 mm to 0.8 mm) is formed between the upper portion of the side member 310 and the upper portion of the first non-conductive member 410 and the resin type the second non-conductive member 420 smoothly flows therebetween by the reduced length in the z-axis direction of the conductive pattern 411 partially disposed between the first non-conductive member 410 and the second non-conductive member 420 and by the first inclined surface 615 of the first non-conductive member 410 formed on the fourth portion 424 of the second non-conductive member 420 and the second inclined surface 915 formed on the fifth portion 425 thereof, thereby inhibiting the incomplete molding of the second non-conductive member 420.

Figure 11:
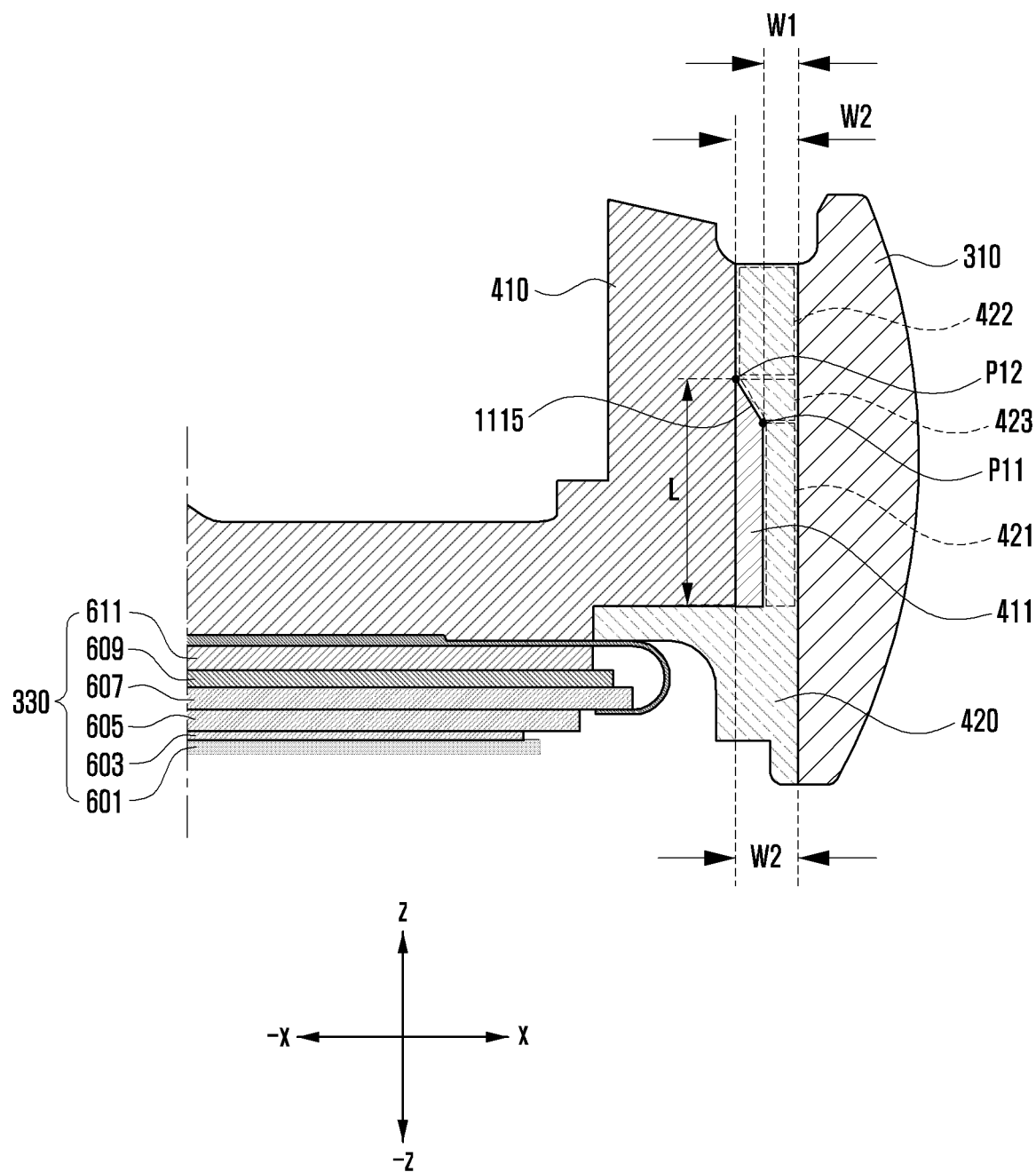

Referring to FIG. 11, the electronic device 300 according to certain embodiments of the disclosure may include the side member 310 disposed on the outermost side thereof.

According to an embodiment, the second non-conductive member 420 may be disposed between the side member 310 and the conductive pattern 411 and the first non-conductive member 410.

According to certain embodiments, at least a portion of the conductive pattern 411 may be disposed between the first non-conductive member 410 and the second non-conductive member 420.

According to an embodiment, the z-axis directional length (L) of the conductive pattern 411 may be shorter than the z-axis directional lengths of the first non-conductive member 410 and the second non-conductive member 420. In an embodiment, the conductive pattern 411 may be disposed to be surrounded by the first non-conductive member 410 and the second non-conductive member 420. According to certain embodiments, since the z-axis directional length (L) of the conductive pattern 411 is shorter than the z-axis directional lengths of the first non-conductive member 410 and the second non-conductive member 420, the conductive pattern 411 may be spaced apart from the display 330 by a specified distance in the +z-axis direction while being disposed between the lower portion of the first non-conductive member 410 and the second non-conductive member 420.

According to certain embodiments, a second inclined surface 1115 may be formed on at least a portion of the conductive pattern 411 where the conductive pattern 411 and the second non-conductive member 420 face each other. For example, the second inclined surface 1115 formed on the conductive pattern 411 may extend from an eleventh point (P11) to a twelfth point (P12). In an embodiment, the second inclined surface 1115 may be formed at one corner (e.g., the eleventh point (P11)) in the +z axis direction of the conductive pattern 411 toward a direction between the −x axis and the +z axis. The eleventh point (P11) and the twelfth point (P12) may be, for example, corners in the +z-axis direction of the conductive pattern 411. In an embodiment, the twelfth point (P12) may be a position moved from the eleventh point (P11) in the −x-axis direction and the +z-axis direction. For example, the twelfth point (P12) may be located farther than the eleventh point (P11) from the side member 310. As still another example, the twelfth point (P12) may be located farther than the eleventh point (P11) from the display 330.

According to certain embodiments, a first width (W1) of a first portion 421 of the second non-conductive member 420 positioned between the side member 310 and the conductive pattern 411 may be narrower than a second width (W2) of a second portion 422 of the second non-conductive member 420 positioned between the side member 310 and the first non-conductive member 410. The second width (W2) of the second portion 422 of the second non-conductive member 420 may be wider than the first width (W1) of the first portion 421. A third portion 423 of the second non-conductive member 420 on which the second inclined surface 1115 formed on the conductive pattern 411 is positioned may be positioned between the first portion 421 and the second portion 422. For example, a portion of the third portion 423 may have the first width (W1), and the other portion of the third portion 423 may have the second width (W2). For example, the first width (W1) may be about 0.4 mm to 0.6 mm, and the second width (W2) may be about 0.8 mm to 0.9 mm.

According to certain embodiments, when the first width (W1) between the side member 310 and the conductive pattern 411 is reduced, for example, from about 0.8 mm to 0.9 mm to about 0.4 mm to 0.6 mm, a space (e.g., the first width (W1)) into which the resin type second non-conductive member 420 flows may be reduced. The second non-conductive member 420 may be incompletely molded due to the internal pressure increasing during injection when the resin type second non-conductive member 420 flows therethrough if the resin were inhibited from fully flowing by the reduced space and the increased pressure.

According to certain embodiments, the resin-type second non-conductive member 420 smoothly flows by the reduced length in the z-axis direction of the conductive pattern 411 partially disposed between the first non-conductive member 410 and the second non-conductive member 420 and by the second inclined surface 1115 of the conductive pattern 411 located on the third portion 423 of the second non-conductive member 420, thereby inhibiting the incomplete molding of the second non-conductive member 420.

Figure 12:
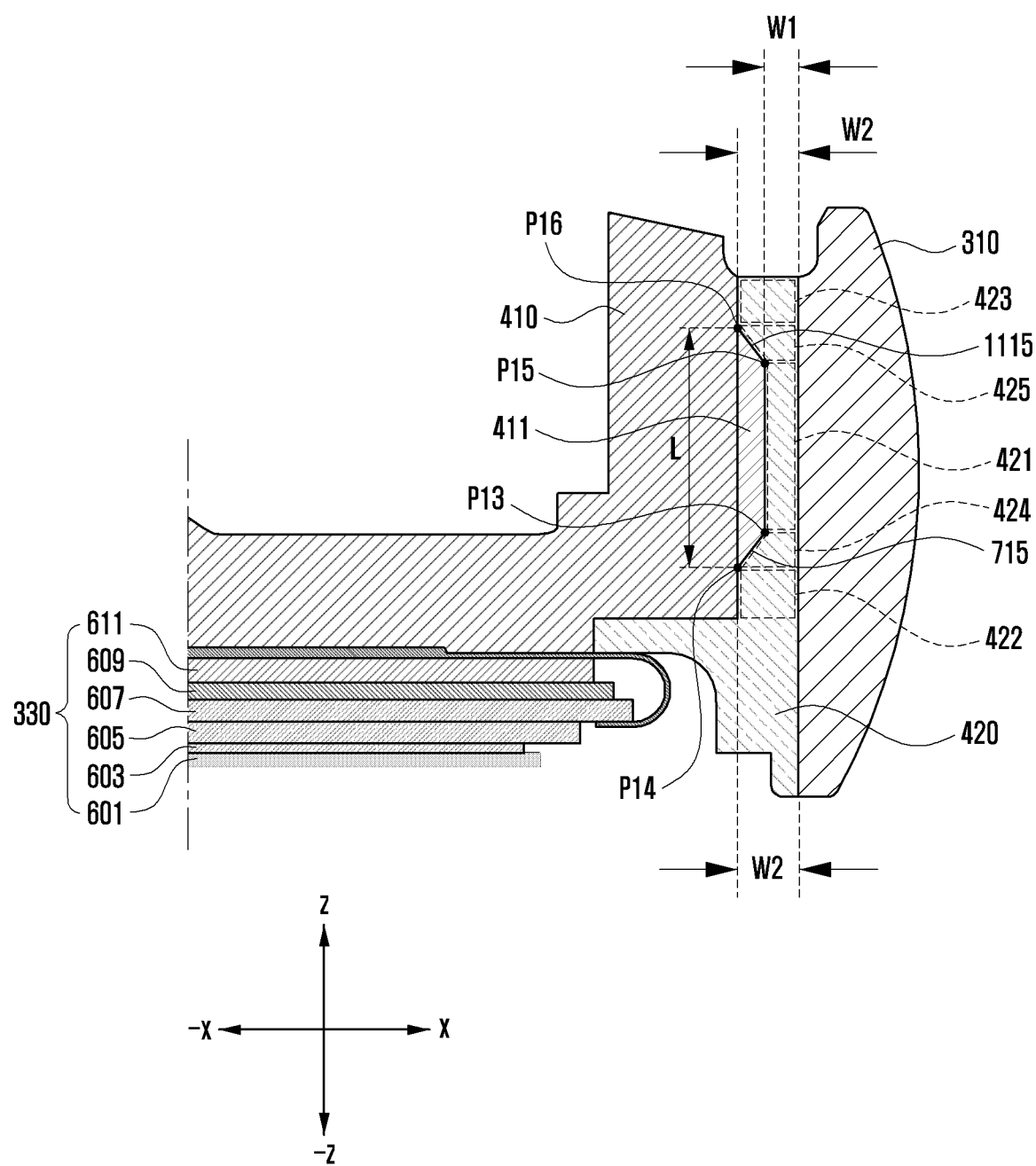

Referring to FIG. 12, the electronic device 300 according to certain embodiments of the disclosure may include the side member 310 disposed on the outermost side thereof.

According to an embodiment, the second non-conductive member 420 may be disposed between the side member 310 and the conductive pattern 411 and the first non-conductive member 410.

According to certain embodiments, at least a portion of the conductive pattern 411 may be disposed between the first non-conductive member 410 and the second non-conductive member 420.

According to an embodiment, the z-axis directional length (L) of the conductive pattern 411 may be shorter than the z-axis directional lengths of the first non-conductive member 410 and the second non-conductive member 420. In an embodiment, the conductive pattern 411 may be disposed to be surrounded by the first non-conductive member 410 and the second non-conductive member 420.

According to certain embodiments, the z-axis directional length (L) of the conductive pattern 411 may be shorter than the z-axis directional lengths of the first non-conductive member 410 and the second non-conductive member 420, the conductive pattern 411 may be spaced apart from the display 330 by a specified distance in the +z-axis direction while being disposed between the upper and lower portions of the first non-conductive member 410 and between the upper and lower portions of the second non-conductive member 420.

According to certain embodiments, a first inclined surface 715 and a second inclined surface 1115 may be formed on at least a portion of the conductive pattern 411 where the conductive pattern 411 and the second non-conductive member 420 face each other. The first inclined surface 715 may be formed adjacent to one end in the −z-axis direction of the conductive pattern 411. The second inclined surface 1115 may be formed adjacent to the other end in the +z-axis direction of the conductive pattern 411. In an embodiment, the first inclined surface 715 formed on the conductive pattern 411 may extend from a thirteenth point (P13) to a fourteenth point (P14). For example, the first inclined surface 715 may be formed at one corner (e.g., the thirteenth point (P13)) in the −z axis direction of the conductive pattern 411 toward a direction between the −x axis and the −z axis. The thirteenth point (P13) and the fourteenth point (P14) may be, for example, corners positioned in the −z-axis direction of the conductive pattern 411. In an embodiment, the fourteenth point (P14) may be a position moved from the thirteenth point (P13) in the −x-axis direction and the −z-axis direction. For example, the fourteenth point (P14) may be located farther than the thirteenth point (P13) from the side member 310. As another example, the thirteenth point (P13) may be located farther than the fourteenth point (P14) from the display 330. In still another example, the second inclined surface 1115 may extend from a fifteenth point (P15) to a sixteenth point (P16). In an embodiment, the second inclined surface 1115 may be formed at one edge (e.g., the fifteenth point (P15)) in the z-axis direction of the conductive pattern 411 toward a direction between the −x-axis and the z-axis. The fifteenth point (P15) and the sixteenth point (P16) may be, for example, corners positioned in the z-axis direction of the conductive pattern 411. In an embodiment, the sixteenth point (P16) may be a position moved from the fifteenth point (P15) in the −x-axis direction and the +z-axis direction. For example, the sixteenth point (P16) may be located farther than the fifteenth point (P15) from the side member 310. As still another example, the sixteenth point (P16) may be located farther than the fifteenth point (P15) from the display 330.

According to certain embodiments, a first width (W1) of a first portion 421 of the second non-conductive member 420 positioned between the side member 310 and the conductive pattern 411 may be narrower than second widths (W2) of a second portion 422 and a third portion 423 of the second non-conductive member 420 positioned between the side member 310 and the first non-conductive member 410. The second widths (W2) of the second portion 422 and the third portion 423 of the second non-conductive member 420 may be wider than the first width (W1) of the first portion 421. A fourth portion 424 of the second non-conductive member 420 on which the first inclined surface 715 formed on the conductive pattern 411 is positioned may be positioned between the first portion 421 and the second portion 422. A fifth portion 425 of the second non-conductive member 420 on which the second inclined surface 1115 formed on the conductive pattern 411 is positioned may be positioned between the first portion 421 and the third portion 423. For example, at least a portion of the fourth portion 424 and at least one portion of the fifth portion 425 may have the first width (W1), and the other portion of the fourth portion 424 and the other portion of the fifth portion 425 may have the second width (W2). For example, the first width (W1) may be about 0.4 mm to 0.6 mm, and the second width (W2) may be about 0.8 mm to 0.9 mm.

According to certain embodiments, when the first width (W1) between the side member 310 and the conductive pattern 411 is reduced, for example, from about 0.8 mm to 0.9 mm to about 0.4 mm to 0.6 mm, a space (e.g., the first width (W1)) into which the resin type second non-conductive member 420 flows may be reduced. In this case, a defect may occur when the resin type second non-conductive member 420 flows therethrough, and the second non-conductive member 420 may be incompletely molded due to the internal pressure increasing during injection.

According to certain embodiments, the second portion 422 and the third portion 423 may have the second width (W2) (e.g., about 0.8 mm to 0.9 mm), and the resin type second non-conductive member 420 smoothly flows therethrough by the reduced length in the z-axis direction of the conductive pattern 411 partially disposed between the first non-conductive member 410 and the second non-conductive member 420 and by the first inclined surface 715 of the conductive pattern 411 formed on the fourth portion of the second non-conductive member 420 and the second inclined surface 1115 formed on the fifth portion 425 thereof, thereby preventing the incomplete molding of the second non-conductive member 420.

Figure 13:
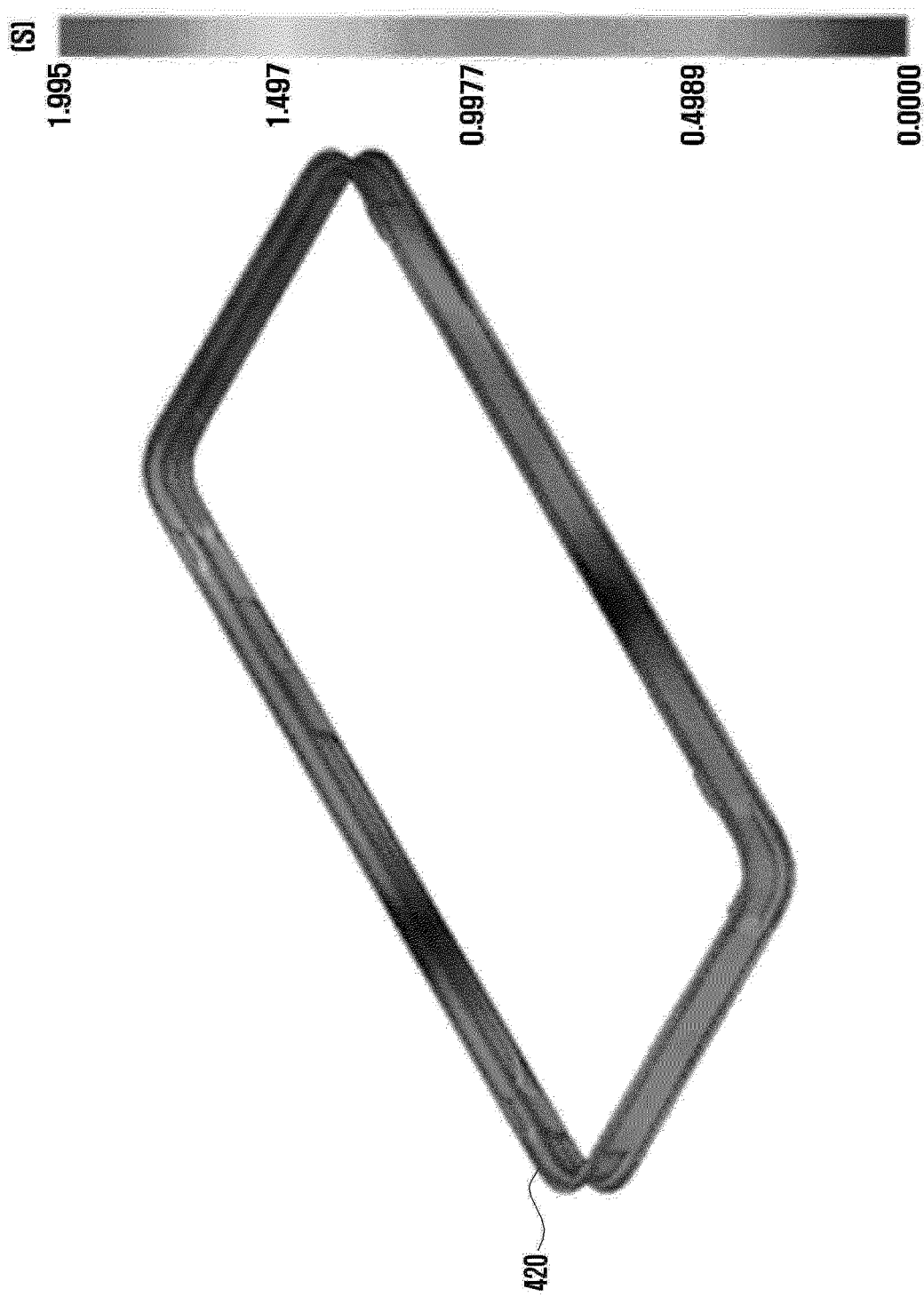
FIG. 13 illustrates a state in which a second non-conductive member of an electronic device is molded, according to certain embodiments of the disclosure.

FIG. 13 illustrates a state in which a second non-conductive member of an electronic device is molded, according to certain embodiments of the disclosure.

Referring to FIG. 13, even if the widths formed at the upper portion (e.g., the z-axis direction), the middle portion, and/or the lower portion (the −z-axis direction) of the second non-conductive member 420 are reduced as described with reference to FIGS. 4 to 12, the resin-type second non-conductive member 420 smoothly flows therethrough in the −z-axis direction by the first inclined surface 615 and/or the second inclined surface 915 formed on the first non-conductive member 410, the conductive pattern 411 having a reduced length in the z-axis direction or the −z-axis direction, and/or the first inclined surface 715 and/or the second inclined surface 1115 formed on the conductive pattern 411, thereby preventing the incomplete molding of the second non-conductive member 420.

As noted from FIG. 13, the incomplete molding in which the second non-conductive portion 420 is partially unfilled is prevented, and the injection-molding takes place in about 0.1 seconds to 1.995 seconds.

Figure 14:
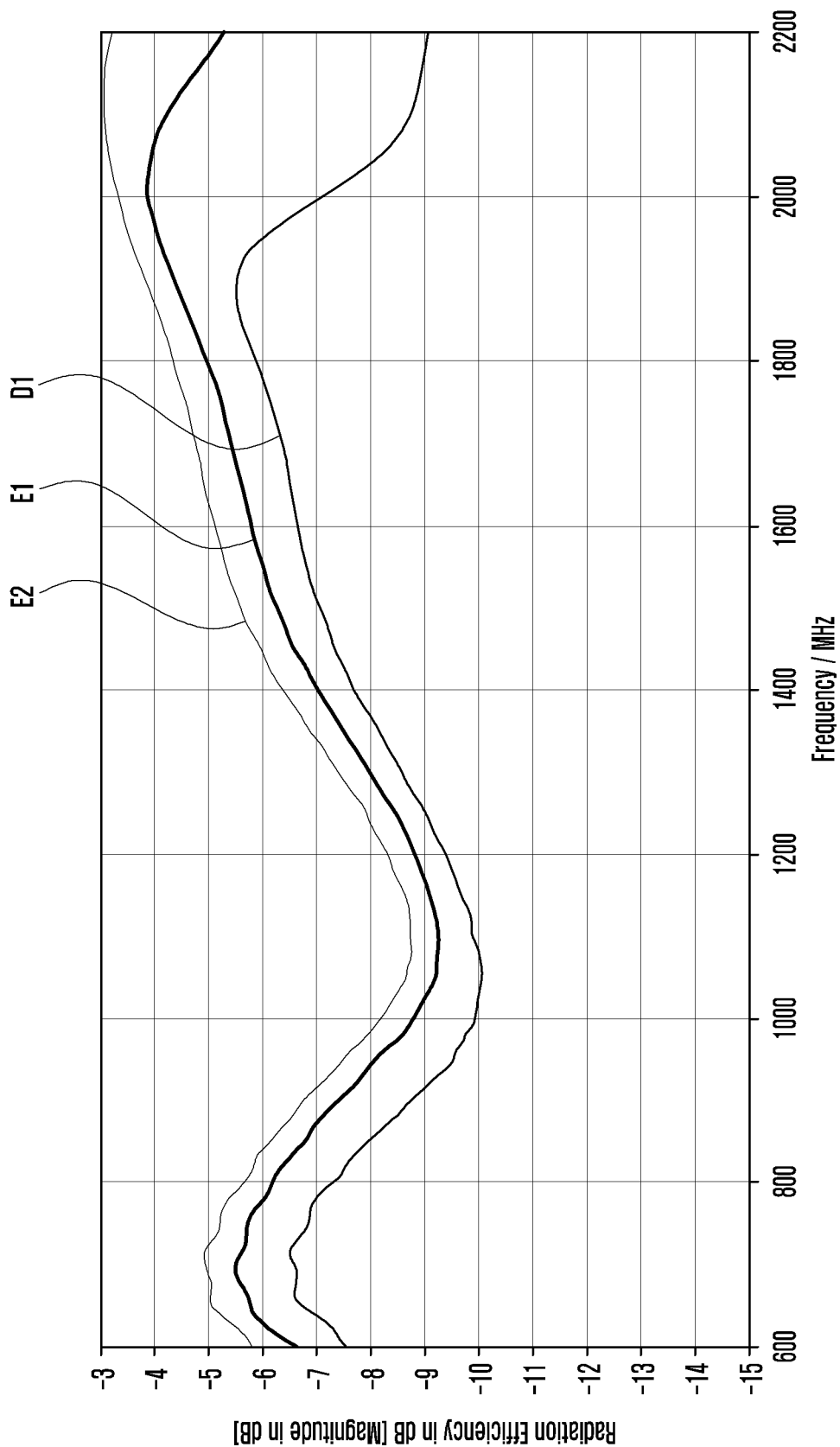
FIG. 14 is a view illustrating radiation efficiency of an antenna of an electronic device according to certain embodiments of the disclosure.

FIG. 14 is a view illustrating radiation efficiency of an antenna of an electronic device according to certain embodiments of the disclosure.

According to an embodiment, it is noted that the electronic device 300 according to certain embodiments of the disclosure includes the second non-conductive member 420 having a reduced width by about 0.2 mm, compared to the width (e.g., about 0.8 mm to 0.9 mm) thereof according to the comparative embodiment, and has an improved first radiation efficiency (E1) that secures a separation distance between the conductive pattern 411 and other electronic components (e.g., the display 330) by about 0.5 dB to 4 dB in the band of about 600 MHz to 2200 MHz, compared to the radiation efficiency (D1) according to the comparative embodiment.

According to certain embodiments, it is noted that the electronic device 300 according to certain embodiments of the disclosure includes the second non-conductive member having a reduced width by about 0.4 mm, compared to the width (e.g., about 0.8 mm to 0.9 mm) thereof according to the comparative embodiment, and has an improved second radiation efficiency (E2) that secures a separation distance between the conductive pattern 411 and other electronic components (e.g., the display 330) by about 1 dB to 6 dB in the band of about 600 MHz to 2200 MHz, compared to the radiation efficiency (D1) according to the comparative embodiment.

Figure 15:
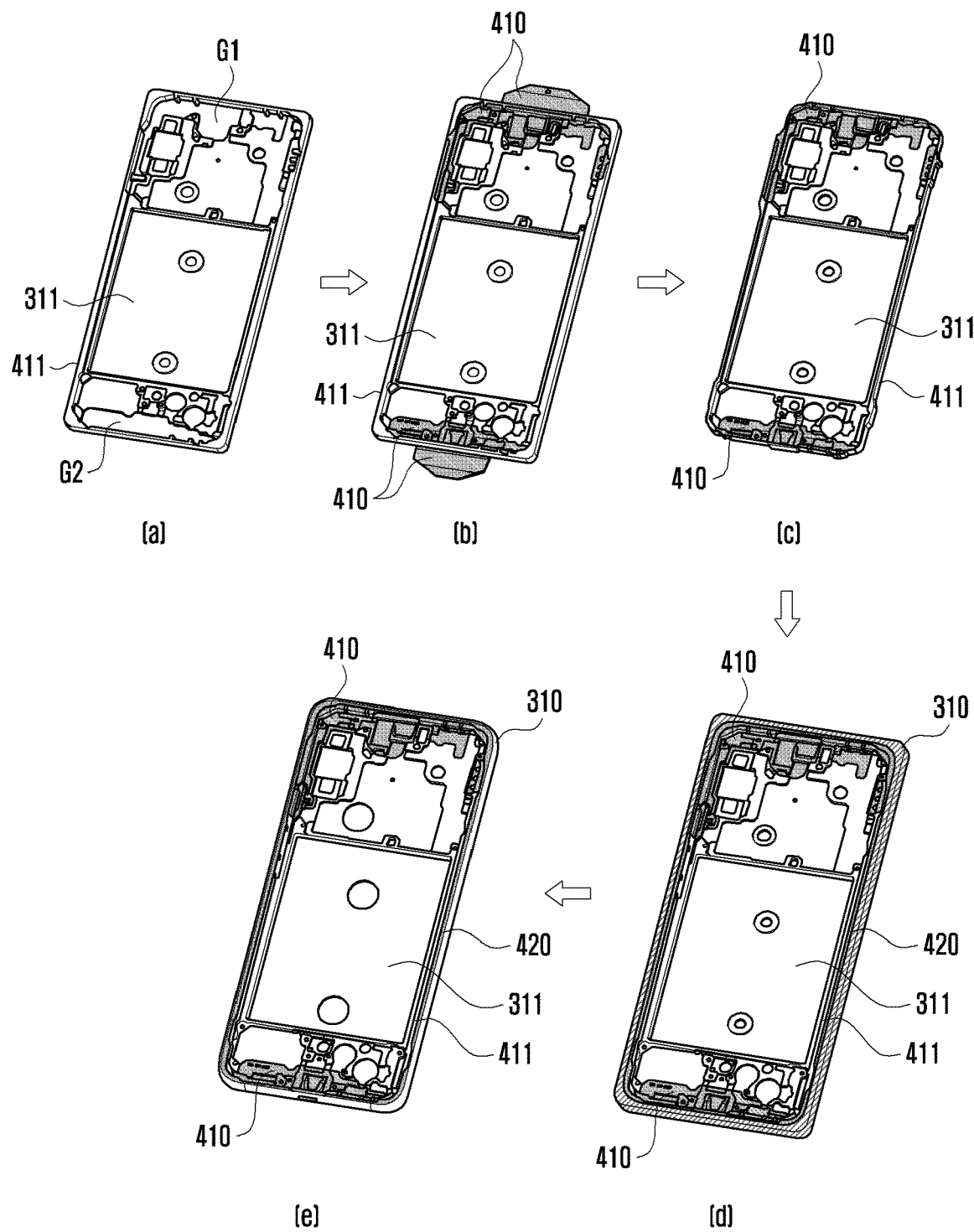
FIG. 15 is a flowchart illustrating a method for manufacturing an electronic device including an antenna according to certain embodiments of the disclosure.

FIG. 15 is a flowchart illustrating a method for manufacturing an electronic device including an antenna according to certain embodiments of the disclosure.

The operations shown in FIG. 15 may be applied to the embodiments disclosed in FIGS. 4 to 12 described above.

As shown in step (a) of FIG. 15, in a first operation, a metal material (e.g., aluminum) may be machined into shapes to be used as the support member 311 and the conductive pattern 411 by applying a die casting or computerized numerical control (CNC) method thereto.

According to certain embodiments, the conductive pattern 411 may be formed along the periphery of the support member 311. The support member 311 may include a first gap (G1) formed on a portion on the upper portion thereof and/or a second gap (G2) formed on a portion of the lower portion thereof.

As shown in step (b) of FIG. 15, in a second operation, the first non-conductive member 410 may be coupled to at least a portion of the machined support member 311 and at least a portion of the machined conductive pattern 411 by using insert-injection.

According to certain embodiments, the first non-conductive member 410 may be coupled to at least a portion of the inner side of the conductive pattern 411 and the first gap (G1) and the second gap (G2) which are formed on the support member 311.

As shown in step (c) of FIG. 15, in a third operation, the outer surfaces of the insert-injected support member 311, conductive pattern 411, and/or first non-conductive member 410 may be machined using a computerized numerical control (CNC) method such that the second non-conductive member 420 can be injection-molded.

As shown in step (d) of FIG. 15, in a fourth operation, the second non-conductive member 420 may be injection-molded using insert-injection performed between the machined conductive pattern 411 and the machined side member 310.

As shown in step (e) of FIG. 15, in a fifth operation, by using a computerized numerical control (CNC) method, the outer surface of the side member 310 may be machined into the same shape as a contact surface of the conductive pattern 411.

An electronic device 300 according to certain embodiments of the disclosure may include a housing including a front plate 320, a rear plate 380, and a side member 310 surrounds a space formed by the front plate 320 and the rear plate 380, a support member 311 disposed in the space, at least one electronic component disposed in the space (e.g., the display 330 of FIG. 6), a first non-conductive member 410 disposed on at least a portion of the support member 311 and on the side member 310, a conductive pattern 411 at least partially disposed between the side member 310 and the first non-conductive member 410, and a second non-conductive member 420 disposed between the side member 310 and a portion of the conductive pattern 411 and a portion of the first non-conductive member 410. At least a portion of the conductive pattern 411 may be spaced apart from the at least one electronic component by a predetermined distance, and a first inclined surface 615 may be formed on a portion of the first non-conductive member 410.

According to certain embodiments, a length (L) of the conductive pattern 411 in one direction thereof may be shorter than the lengths of the first non-conductive member 410 and the second non-conductive member 420 in one direction thereof.

According to certain embodiments, a second width (W2) of a second portion 422 of the second non-conductive member 420 positioned between the side member 310 and the first non-conductive member 410 may be wider than a first width (W1) of a first portion 421 of the second non-conductive member 420 positioned between the side member 310 and the conductive pattern 411.

According to certain embodiments, the side member 310 may be made of a ceramic material having a permittivity of about 7 to 25.

According to certain embodiments, a third portion 423 of the second non-conductive member 420 may be positioned between the first portion 421 and the second portion 422, and the first inclined surface 615 may be positioned on the third portion 423.

According to certain embodiments, the at least one electronic component may include a display 330.

According to certain embodiments, the first inclined surface 615 formed on the first non-conductive member 410 may extend from a first point (P1) positioned adjacent to one end of the conductive pattern 411 to a second point (P2) positioned far from one end of the conductive pattern 411, and the second point (P2) may be located farther than the first point (P1) from the side member 310.

An electronic device 300 according to certain embodiments of the disclosure may include a housing including a front plate 320, a rear plate 380, and a side member 310 configured to surround a space formed by the front plate 320 and the rear plate 380, a support member 311 disposed in the space, at least one electronic component disposed in the space (e.g., the display 330 of FIG. 6), a first non-conductive member 410 disposed on at least a portion of the support member 311 and on the side member 310, a conductive pattern 411 at least partially disposed between the side member 310 and the first non-conductive member 410, and a second non-conductive member 420 disposed between the side member 310 and a portion of the conductive pattern 411 and a portion of the first non-conductive member 410. At least a portion of the conductive pattern 411 may be spaced apart from the at least one electronic component by a predetermined distance, and each of a first inclined surface 615 and a second inclined surface 915 may be formed on at least a portion of the first non-conductive member 410.

According to certain embodiments, a length (L) of the conductive pattern 411 in one direction thereof may be shorter than lengths of the first non-conductive member 410 and the second non-conductive member 420 in one direction thereof.

According to certain embodiments, the first inclined surface 615 may be formed adjacent to one end of the conductive pattern 411, and the second inclined surface 915 may be formed adjacent to the other end of the conductive pattern 411.

According to certain embodiments, a second width (W2) of a second portion 422 or a third portion 423 of the second non-conductive member 420 positioned between the side member 310 and the first non-conductive member 410 may be wider than a first width (W1) of a first portion 421 of the second non-conductive member positioned between the side member 310 and the conductive pattern 411.

According to certain embodiments, the second portion 422 may be a portion adjacent to one end of the conductive pattern 411, and the third portion 423 may be a portion adjacent to the other end of the conductive pattern 411. According to certain embodiments, a fourth portion 424 of the second non-conductive member 420 may be positioned between the first portion 421 and the second portion 422 such that the first inclined surface 615 is formed on the fourth portion 424, and a fifth portion 425 of the second non-conductive member 420 may be positioned between the first portion 421 and the third portion 423 such that the second inclined surface 915 is formed on the fifth portion 425.

According to certain embodiments, the first inclined surface 615 formed on the first non-conductive member 410 may extend from a first point (P1) positioned adjacent to one end of the conductive pattern 411 to a second point (P2) positioned far from one end of the conductive pattern 411 such that the second point (P2) is located farther than the first point (P1) from the side member 310, and the second inclined surface 915 may extend from a third point (P3) positioned adjacent to the other end of the conductive pattern 411 to a fourth point (P4) positioned far from the other end of the conductive pattern 411 such that the fourth point (P4) is located farther than the third point (P3) from the side member 310.

An electronic device 300 according to certain embodiments of the disclosure may include a housing including a front plate 320, a rear plate 380, and a side member 310 may surround a space formed by the front plate 320 and the rear plate 380, a support member 311 disposed in the space, at least one electronic component disposed in the space (e.g., the display 330 of FIG. 6), a first non-conductive member 410 disposed on at least a portion of the support member 311 and on the side member 310, a conductive pattern 411 disposed at least partially between the side member 310 and the first non-conductive member 410, and a second non-conductive member 420 disposed between the side member 310 and a portion of the conductive pattern 411 and a portion of the first non-conductive member 410. At least a portion of the conductive pattern 411 may be spaced apart from the at least one electronic component by a predetermined distance, and a first inclined surface 715 may be formed on a portion of the conductive pattern 411.

According to certain embodiments, a length (L) of the conductive pattern 411 in one direction thereof may be shorter than lengths of the first non-conductive member 410 and the second non-conductive member 420 in one direction thereof.

According to certain embodiments, a second width (W2) of a second portion 422 of the second non-conductive member 420 positioned between the side member 310 and the first non-conductive member 410 may be wider than a first width (W1) of a first portion 421 of the second non-conductive member 420 positioned between the side member 310 and the conductive pattern 411.

According to certain embodiments, a third portion 423 of the second non-conductive member 420 may be positioned between the first portion 421 and the second portion 422, and the first inclined surface 715 may be positioned on the third portion 423.

According to certain embodiments, the first inclined surface 715 may extend from a first point (P3) positioned adjacent to one end of the conductive pattern 411 to a second point (P4) positioned far from one end of the conductive pattern 411, and the second point (P4) may be located farther than the first point (P3) from the side member 310.

A method for manufacturing an electronic device 300 according to certain embodiments of the disclosure may include: machining a metal material into shapes of the support member 311 and the conductive pattern 411 by applying a die casting or computerized numerical control (CNC) method thereto; coupling the first non-conductive member 410 to at least a portion of the machined support member 311 and at least a portion of the machined conductive pattern 411 by using insert-injection; machining the outer surfaces of the insert-injected support member 311, conductive pattern 411, and/or first non-conductive member 410 by using a computerized numerical control (CNC) method such that a second non-conductive member 420 injection-mold can be injection-molded; injection-molding the second non-conductive member 420 by using insert-injection performed between the machined conductive pattern 411 and the machined side member 310; and by using a computerized numerical control (CNC) method, machining the outer surface of the side member 310 and forming a contact surface of the conductive pattern 411.

Although the disclosure has been described according to certain embodiments of the disclosure, it will be apparent to those of ordinary skill in the art to which the disclosure belongs that the changes and modifications made without departing from the technical idea of the disclosure also belong to the disclosure.

The invention claimed is:

1. An electronic device comprising:
a housing comprising a front plate, a rear plate, and a side member surrounding a space formed by the front plate and the rear plate;
a support member disposed in the space;
at least one electronic component disposed in the space;
a first non-conductive member disposed on at least a portion of the support member and on the side member;
a conductive pattern at least partially disposed between the side member and the first non-conductive member; and
a second non-conductive member disposed between the side member and a first portion of the conductive pattern and a first portion of the first non-conductive member,
wherein at least a second portion of the conductive pattern is spaced apart from the at least one electronic component by a predetermined distance, and
a first inclined surface is formed on a second portion of the first non-conductive member,
wherein the first non-conductive member and the second non-conductive member form a slot, the slot substantially parallel to and spaced apart from the side member, and
wherein the conductive pattern is disposed in and substantially filling the slot.

2. The electronic device of claim 1, wherein a length of the conductive pattern in one direction thereof is shorter than a first length of the first non-conductive member and a second length of the second non-conductive member in one direction thereof.

3. The electronic device of claim 1, wherein the first portion of the first non-conductive member has a first width and the second non-conductive member has a second width, the second width being wider than the first width.

4. The electronic device of claim 1, wherein the side member is made of a ceramic material having a permittivity of 7 to 25 F/m.

5. The electronic device of claim 3, wherein:
a third portion of the second non-conductive member is positioned between the first portion and the second portion; and
the first inclined surface is positioned on the third portion.

6. The electronic device of claim 1, wherein the at least one electronic component comprises a display.

7. The electronic device of claim 1, wherein:
the first inclined surface extends from a first point positioned adjacent to one end of the conductive pattern to a second point positioned far from one end of the conductive pattern; and
the second point is located farther than the first point from the side member.

8. The electronic device of claim 1, wherein the first inclined surface is directly above or below the slot.

9. An electronic device comprising:
a housing comprising a front plate, a rear plate, and a side member surrounds a space formed by the front plate and the rear plate;
a support member disposed in the space;
at least one electronic component disposed in the space;
a first non-conductive member disposed on at least a portion of the support member and on the side member;
a conductive pattern at least partially disposed between the side member and the first non-conductive member; and
a second non-conductive member disposed between the side member and a portion of the conductive pattern and a portion of the first non-conductive member,
wherein at least a portion of the conductive pattern is spaced apart from the at least one electronic component by a predetermined distance, and
each of a first inclined surface and a second inclined surface is formed on at least a first portion of the first non-conductive member,
wherein the first non-conductive member and the second non-conductive member form a slot, the slot substantially parallel to and spaced apart from the side member, and
wherein the conductive pattern is disposed in and substantially filling the slot.

10. The electronic device of claim 9, wherein a length of the conductive pattern in one direction thereof is shorter than a first length of the first non-conductive member and a second length the second non-conductive member in one direction thereof.

11. The electronic device of claim 9, wherein the first inclined surface is formed adjacent to one end of the conductive pattern, and the second inclined surface is formed adjacent to the other end of the conductive pattern.

12. The electronic device of claim 9, wherein a second width of a second portion or a third portion of the second non-conductive member positioned between the side member and the first non-conductive member is wider than a first width of a first portion of the second non-conductive member positioned between the side member and the conductive pattern.

13. The electronic device of claim 12, wherein the second portion is a portion adjacent to one end of the conductive pattern, and the third portion is a portion adjacent to the other end of the conductive pattern.

14. The electronic device of claim 13, wherein a fourth portion of the second non-conductive member is positioned between the first portion and the second portion such that the first inclined surface is formed on the fourth portion, and a fifth portion of the second non-conductive member is positioned between the first portion and the third portion such that the second inclined surface is formed on the fifth portion.

15. The electronic device of claim 9, wherein the first inclined surface extends from a first point positioned adjacent to one end of the conductive pattern to a second point positioned far from one end of the conductive pattern such that the second point is located farther than the first point from the side member, and the second inclined surface extends from a third point positioned adjacent to the other end of the conductive pattern to a fourth point positioned far from the other end of the conductive pattern such that the fourth point is located farther than the third point from the side member.

16. An electronic device comprising:
a housing comprising a front plate, a rear plate, and a side member surrounds a space defined by the front plate and the rear plate;
a support member disposed in the space;
at least one electronic component disposed in the space;
a first non-conductive member disposed on at least a portion of the support member and on the side member;
a conductive pattern disposed at least partially between the side member and the first non-conductive member; and
a second non-conductive member disposed between the side member and a portion of the conductive pattern and a portion of the first non-conductive member,
wherein at least a portion of the conductive pattern is spaced apart from the at least one electronic component by a predetermined distance, and a first inclined surface is disposed on a portion of the conductive pattern,
wherein the first non-conductive member and the second non-conductive member form a slot, the slot substantially parallel to and spaced apart from the side member, and
wherein the conductive pattern is disposed and substantially filling in the slot.

17. The electronic device of claim 16, wherein a length of the conductive pattern in one direction thereof is shorter than lengths of the first non-conductive member and the second non-conductive member in one direction thereof.

18. The electronic device of claim 16, wherein a second width of a second portion of the second non-conductive member positioned between the side member and the first non-conductive member is wider than a first width of a first portion of the second non-conductive member positioned between the side member and the conductive pattern.

19. The electronic device of claim 18, wherein a third portion of the second non-conductive member is positioned between the first portion and the second portion, and the first inclined surface is positioned on the third portion.

20. The electronic device of claim 16, wherein the first inclined surface extends from a first point positioned adjacent to one end of the conductive pattern to a second point positioned far from one end of the conductive pattern, and the second point is located farther than the first point from the side member.

21. A method for manufacturing an electronic device, the method comprising:
machining a metal material into shapes of a support member and a conductive pattern;
coupling the first non-conductive member to at least a portion of the machined support member and at least a portion of the machined conductive pattern by using insert-injection;
machining at least one of the outer surfaces of the insert-injected support member, the conductive pattern, and the first non-conductive member such that a second non-conductive member can be injection-molded;
injection-molding the second non-conductive member by using insert-injection performed between the machined conductive pattern and the machined side member, thereby forming a slot with the first non-conductive member, the slot substantially parallel to and spaced apart from the side member; and
machining the outer surface of the side member and forming a contact surface of the conductive pattern.

\* \* \* \* \*